US011549909B2

(12) United States Patent
Lyford et al.

(10) Patent No.: US 11,549,909 B2
(45) Date of Patent: Jan. 10, 2023

(54) ELUTION AND DETECTION

(71) Applicant: GREYSCAN PTY LTD, Victoria (AU)

(72) Inventors: Graham William Lyford, Victoria (AU); Michael Smith, Victoria (AU); Alistair Stuart Webb, Victoria (AU); Adam John Cusick, Victoria (AU); Leigh Ryan, Victoria (AU); Ian Emil Sohn, Victoria (AU)

(73) Assignee: GREYSCAN PTY LTD, Victoria (AU)

( * ) Notice: Subject to any disclaimer, the term of this patent is extended or adjusted under 35 U.S.C. 154(b) by 166 days.

(21) Appl. No.: 16/325,600

(22) PCT Filed: Aug. 15, 2017

(86) PCT No.: PCT/AU2017/050862
§ 371 (c)(1),
(2) Date: Feb. 14, 2019

(87) PCT Pub. No.: WO2018/032044
PCT Pub. Date: Feb. 22, 2018

(65) Prior Publication Data
US 2019/0178839 A1 Jun. 13, 2019

(30) Foreign Application Priority Data

Aug. 15, 2016 (AU) .............................. 2016903232
Jun. 16, 2017 (AU) .............................. 2017902304

(51) Int. Cl.
*G01N 27/447* (2006.01)
*G01N 27/453* (2006.01)
(Continued)

(52) U.S. Cl.
CPC ....... *G01N 27/44739* (2013.01); *B01D 15/42* (2013.01); *B01D 57/02* (2013.01);
(Continued)

(58) Field of Classification Search
CPC ............ B01D 15/10; B01D 15/42–428; G01N 27/44743; G01N 27/44756; G01N 27/44791
See application file for complete search history.

(56) References Cited

U.S. PATENT DOCUMENTS 5,126,272 A * 6/1992 Kingston, Jr. ......... G01N 1/405
 210/656
5,131,998 A * 7/1992 Jorgenson .............. B01D 15/08
 204/604

(Continued)

FOREIGN PATENT DOCUMENTS

AU 2015215950 9/2015
AU 2015215950 A1 * 9/2015 ............... G01N 1/34

(Continued)

OTHER PUBLICATIONS

"Jig" defintion from the Merriam-Webster online dictionary, downloaded Feb. 11, 2021 (Year: 2021).*

(Continued)

*Primary Examiner* — Alexander S Noguerola
(74) *Attorney, Agent, or Firm* — Norton Rose Fulbright US LLP

(57) ABSTRACT

An elution apparatus and a detection apparatus are described. The elution apparatus includes: a sample trap for trapping a sample; and one or more pumps and/or valves to move a liquid eluent and a liquid eluate, wherein the eluate includes an extracted portion of the sample that is extracted by the eluent. The detection apparatus includes: a capillary having a low-voltage (LV) end portion to receive a sample; and a conductivity detector coupled to a high-voltage (HV) end portion of the capillary to generate signals based on conductivity of a monitored portion of the capillary in the (Continued)

HV end portion, wherein the conductivity detector is electrically isolated from the LV end portion.

22 Claims, 9 Drawing Sheets

(51) Int. Cl.
| | | |
|---|---|---|
| B01D 57/02 | (2006.01) | |
| G01N 27/06 | (2006.01) | |
| B01L 3/00 | (2006.01) | |
| B01D 15/42 | (2006.01) | |
| G01N 1/40 | (2006.01) | |
| G01N 1/28 | (2006.01) | |

(52) U.S. Cl.
CPC .............. *B01L 3/502* (2013.01); *G01N 27/06* (2013.01); *G01N 27/447* (2013.01); *G01N 27/4473* (2013.01); *G01N 27/44743* (2013.01); *G01N 27/44791* (2013.01); *B01L 2300/025* (2013.01); *B01L 2300/0645* (2013.01); *B01L 2300/16* (2013.01); *G01N 1/405* (2013.01); *G01N 2001/2833* (2013.01); *G01N 2001/4061* (2013.01)

(56) References Cited

U.S. PATENT DOCUMENTS

| | | | |
|---|---|---|---|
| 6,326,211 B1* | 12/2001 | Anderson | B01L 3/502746 436/177 |
| 10,020,174 B2* | 7/2018 | Zhang | H01J 49/009 |
| 2007/0187243 A1* | 8/2007 | Patton | G01N 33/6842 204/450 |
| 2007/0263046 A1 | 11/2007 | Iwasa et al. | |
| 2011/0236924 A1* | 9/2011 | Halverson | C12Q 1/02 435/34 |
| 2012/0055798 A1 | 3/2012 | Selden et al. | |
| 2014/0370519 A1 | 12/2014 | Vangbo et al. | |
| 2014/0378341 A1 | 12/2014 | Glezer et al. | |
| 2015/0192544 A1 | 7/2015 | Breadmore et al. | |
| 2018/0104693 A1* | 4/2018 | Merten | G01N 33/5094 |

FOREIGN PATENT DOCUMENTS

| | | |
|---|---|---|
| AU | 2016200080 | 1/2016 |
| WO | WO 2014/026224 | 2/2014 |

OTHER PUBLICATIONS

Beutner et al., "Two-Dimensional Separation of Ionic Species by Hyphenation of Capillary Ion Chromatography x Capillary Electrophoresis-Mass Spectrometry," Anal. Chem. 2015, 87, 3134-3138 (Year: 2015).*
Yang et al., "An integratable microfluidic cartridge for forensic swab samples lysis," Forensic Science International: Genetics 8 (2014) 147-158 (Year: 2014).*
Jiang et al., "Ion-Mobility-Mass Spectrometry," Encyclopedia of Analytical Chemistry, Online 2013 John Wiley & Sons, Ltd (Year: 2013).*
Swanson et al., "An immunochemical approach to indoor aeroallergen quantitation with a new volumetric air sampler: Studies with mite, roach, cat, mouse, and guinea pig antigens," J Allergy Clin Immunol 76:724-9, 1985 (Year: 1985).*
Commonwealth of Australia Gazette, No. 3, Canberra, Thursday, Jan. 13, 1955 (Year: 1955).*
Hopwood et al., "Integrated Microfluidic System for Rapid Forensic DNA Analysis: Sample Collection to DNA Profile,"Anal. Chem. 2010, 82, 6881-68888 (Year: 2010).*
International Preliminary Report on Patentability issued in Application No. PCT/AU2017/050862, dated Feb. 19, 2019.
International Search Report and Written Opinion issued in Application No. PCT/AU2017/050862, dated Nov. 13, 2017.
Werner et al. "Simultaneous determination of neopterin and creatinine in serum with solid-phase extraction and on-line elution liquid chromatography," *Clinical Chemistry*, 1987; 33(11):2028-2033.
Blanco, et al., "Identification of Inorganic Improvised Explosive Devices Using Sequential Injection Capillary Electrophoresis and Contactless Conductivity Detection," *Analytical Chemistry*, 83; 9068-9075, 2011.
Calcerrada, et al., "Recent Advances in Capillary Electrophoresis Instrumentation for the Analysis of Explosives," *Trends in Analytical Chemistry*, 75; 75-85, 2016.
Dawod & Chung, "'High-Sensitivity Capillary and Microchip Electrophoresis Using Electrokinetic Supercharging," *Journal of Separation Science*, 34(20); 2790-2799, 2011.
Graul & Schlenoff, "Capillaries Modified by Polyelectrolyte Multilayers for Electrophoretic Separations," *Analytical Chemistry*, 71(18); 4007-4013, 1999.
Tagliaro, et al., "Capillary Electrophoresis in Forensic Chemistry," *Encyclopedia of Forensic Sciences*, 3; 567-572, 2013.

* cited by examiner

ELUTION AND DETECTION

RELATED APPLICATIONS

This application is a national phase application under 35 U.S.C. § 371 of International Application No. PCT/AU2017/050862, filed Aug. 15, 2017 which claims the benefit of Australian Provisional Patent Application No. 2016903232, filed Aug. 15, 2016, and Australian Provisional Patent Application No. 2017902304, filed Jun. 16, 2017, each of which is incorporated herein by reference in its entirety.

TECHNICAL FIELD

The present invention generally relates to apparatuses, systems and methods for eluting and detecting compounds and ions, e.g., analytes and/or inorganic compounds and their component ions, including an elution apparatus, an elution method, a detection apparatus and a detection method, e.g., to elute and detect inorganic explosive traces for screening inorganic explosives.

BACKGROUND

Increased security measures have become a global priority, e.g., around areas of mass transportation; government, embassy and consular buildings; police and military infrastructure and installations; and critical and high-risk infrastructure. There are currently over 400,000 screening lanes worldwide intended to detect a variety of materials and substances, including weapons, drugs, and contraband.

However, there are significant shortcomings in existing detector technologies. For example, explosive trace detectors (ETD) using ion mobility spectroscopy (IMS) may be unable to identify inorganic-salt-based explosives (e.g., chlorates, nitrates, and/or perchlorates) with sufficient speed and/or accuracy, or at a reasonable cost. IMS may have a limited ability to detect organic peroxide, and may be unable to detect inorganic compounds. Mass spectrometry may be unable to detect inorganic compounds. Ion chromatography may require long analysis times, e.g., more than 25 minutes.

Although capillary electrophoresis or capillary zone electrophoresis ("CZE") may have been proposed for liquid-phase detection, e.g., in International Patent Publication No. WO/2014/026224, existing capillary electrophoresis detectors are still insufficiently sensitive and/or too slow for certain applications.

It is desired to address or ameliorate one or more disadvantages or limitations associated with the prior art, or to at least provide a useful alternative.

SUMMARY

In accordance with the present invention, there is provided an elution apparatus including:
a sample trap for trapping a sample; and
one or more pumps and/or valves to move a liquid eluent (elution fluid) and a liquid eluate, wherein the eluate includes an extracted portion of the sample that is extracted by the eluent.

The sample trap may have surface characteristics for adsorbing the sample. The trapping material may be an adhesive material to adhere the sample. The adhesive material may be an adhesive tape. The sample trap may have a surface structure for absorbing the sample. The sample trap may include a portion of material to adsorb the sample, and the filter includes the portion of the material to filter the eluate.

The elution apparatus may include a filter for filtering the eluate in the elution apparatus.

The present invention also provides an elution method including:
trapping a sample in a sample trap; and
moving a liquid eluent and a liquid eluate, wherein the eluate includes an extracted portion of the sample that is extracted by the eluent.

The elution method can include:
swabbing with the sample trap to trap the sample in the portion of the material;
an elution jig receiving the swabbed sample trap;
closing the elution jig by hand or by an actuator; and/or
initiating a sample processing method controlled by an electronic controller.

The sample processing method can include:
mobilising a first volume of the eluent in the form of a first reagent into the elution jig;
forcing the first reagent through or past the portion of the material, including the portion of the sample trap, to form an eluate;
moving the eluate through a degassing and filtering system;
moving the degassed eluate to a ground manifold such that the degassed eluate is positioned at a Low-Voltage (LV) end of a capillary;
injecting the degassed eluate into the capillary;
flushing a ground manifold with electrolyte to position an electrolyte solution at the LV end of the capillary; and/or
energizing a High Voltage (HV) power supply to separate the sample.

The elution method may include filtering the eluate in the elution apparatus using the portion of the material.

In accordance with the present invention, there is provided a detection apparatus including:
a capillary having a low-voltage (LV) end portion to receive a sample; and
a conductivity detector coupled to a high-voltage (HV) end portion of the capillary to generate signals ("conductivity signals") based on conductivity of a monitored portion of the capillary in the HV end portion,
wherein the conductivity detector is electrically isolated from the LV end portion (for power supply and data communication).

The conductivity is complex conductivity (also known as "admittivity"), which is the sum of a real component called the conductivity and an imaginary component called the susceptance (also known as "susceptivity").

The detection apparatus includes a wireless electrical connection for electrically powering the conductivity detector. The wireless electrical connection includes a wireless electrical transmitter and a wireless electrical receiver.

The detection apparatus includes an optical communications link for transmitting communication signals from and/or to the conductivity detector.

The conductivity detector can be a capacitive conductivity detector, and/or a contactless conductivity detector, and/or a capacitively coupled contactless conductivity detector (C4D) and/or a contacting conductivity detector having electrodes in contact with the capillary fluid.

The detection apparatus includes one or more of:
a phase-sensitive detector for determining an in-phase signal component and a quadrature signal component of the conductivity signals from the conductivity detector;

a signal channel for the conductivity signals from the conductivity detector, and a noise channel for noise signals in a modulated signal generated for the conductivity detector, wherein the noise channel is separate from the signal channel; and a drain conduit for carrying the monitored sample portion away from the conductivity detector, or a sponge, wick or drying surface upon which the monitored sample portion (in solution) from the capillary (once past the detector) is dried (actively) by passing (heated) airflow (to form a solid).

The detection apparatus includes a transmit electrode and a receive electrode, wherein the transmit electrode and the receive electrode are Printed Circuit Board (PCB) assemblies.

The present invention also provides a detection method including:

a capillary having a low-voltage (LV) end portion receiving a sample;

a conductivity detector coupled to a high-voltage (HV) end portion of the capillary, and electrically isolated from the LV end portion (for power supply and communication), generating signals based on the conductivity of a monitored portion of the capillary in the HV end portion.

In accordance with the present invention, there is provided an elution apparatus including:

a sample trap for trapping a sample; and one or more pumps and/or valves to move an eluent (elution fluid) and an eluate, wherein the eluate includes an extracted portion of the sample that is extracted by the eluent.

The present invention also provides an elution method including:

trapping a sample in a sample trap; and moving an eluent and an eluate, wherein the eluate includes an extracted portion of the sample that is extracted by the eluent.

BRIEF DESCRIPTION OF THE DRAWINGS

Embodiments of the present invention are hereinafter described, by way of non-limiting example only, with reference to the accompanying drawings, in which.

DETAILED DESCRIPTION

Overview

Described herein is a system that utilises a capillary electrophoresis (CE) process to analyse samples and detect trace inorganic explosives. CE is a method for separating ions of differing sizes. An HV electric field is applied to ions in solution. The ions move in a direction according to the polarity of the electric field and the polarity of the ion. The ions in the sample flow through the capillary driven by hydrostatic action (i.e., pressure) and electrostatic action (i.e., electro osmotic flow). The capillary is a tube, and its capillary action (also known as "wicking") is not necessary to its function in the system. The speed of each ion is determined by the strength of the electric field and by the electrophoretic mobility of the ion, travelling through the background electrolyte within a capillary, also driven by the electroosmotic flow. Electrophoretic mobility relates to the charge of the ion, the effective cross-sectional area of the ion and the viscosity of the background electrolyte (BGE) that the ion is moving through. The electro osmotic flow is determined by the internal surface area to volume ratio of the capillary, the pH of the BGE and the strength of the applied electric field. Using the different movement rates of different ion types, CE differentiates between ion types by measuring the time the ions take to reach the conductivity detector at a known distance from their starting position. The detected conductivity is complex conductivity (also known as "admittivity"), which is the sum of a real component called the conductivity and an imaginary component called the susceptance (also known as "susceptivity"). This system can therefore be utilised for the detection of inorganic molecules present within explosive devices. The detected analytes can be negative or positive ions. The detected analytes can include the anions: Nitrate, Chlorate, and Perchlorate, along with the cations: Sodium, Potassium, Ammonium and Urea.

The described system uses an applied high voltage (HV) to accelerate the analysis process and to improve sensitivity, and uses fast signal processing to provide measurements quickly (e.g., less than 1 minute).

System 100

Figure 1:
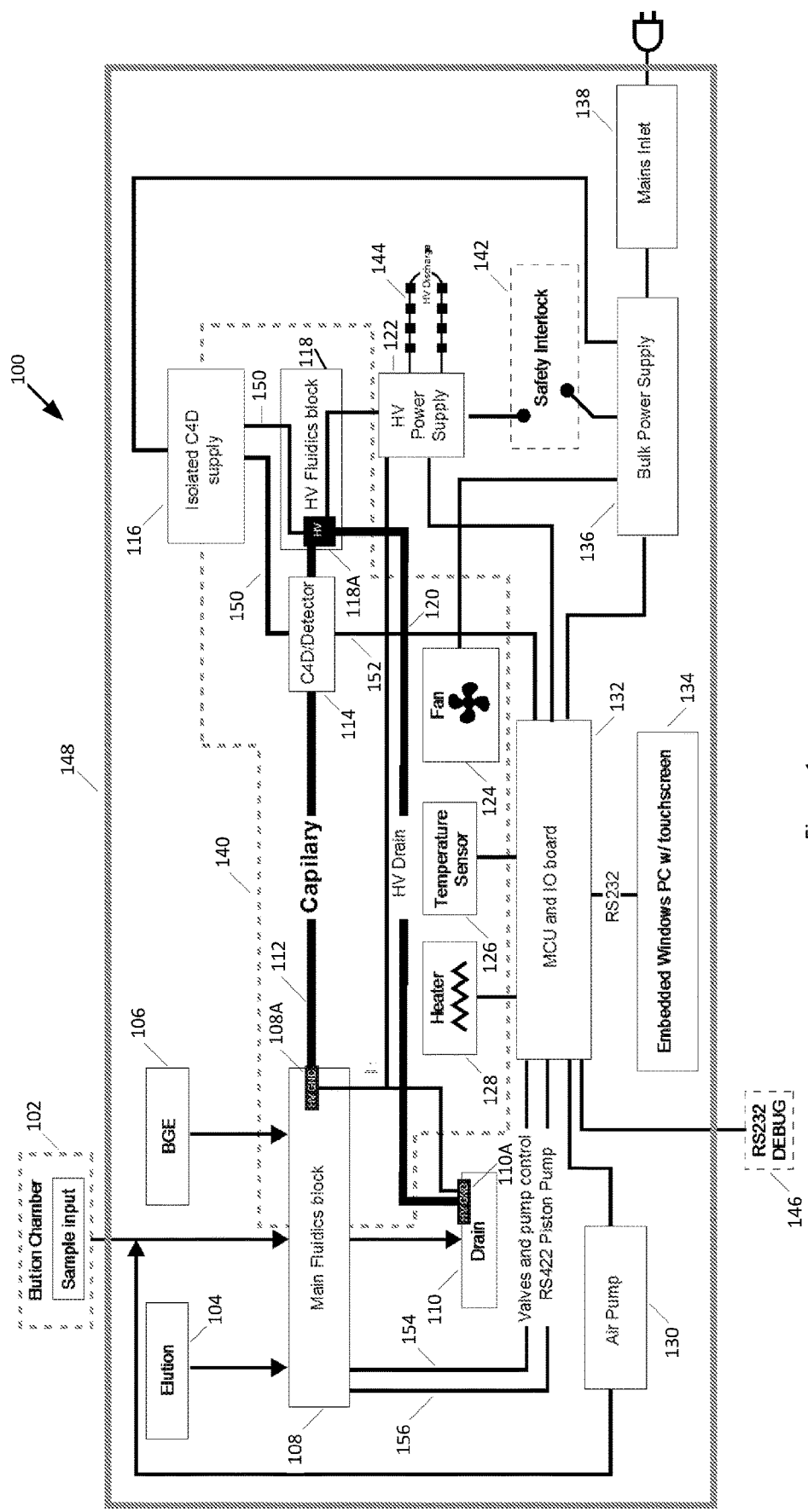
FIG. 1 is a block diagram of a system for detecting compounds, including a detector.

As shown in FIG. 1, a system 100 includes:
a. a sample input 102 (which includes an elution jig);
b. an elution reagent container 104;
c. an electrolyte reagent container 106;
d. a main fluidics block 108 (which is referred to as a "ground manifold");
e. a drain vessel 110;
f. a capillary 112, which is also referred to as a "detection capillary", an "analytical capillary", "separation capillary" and/or a "capillary tube";
g. a capacitively-coupled contactless conductivity detector 114 (which is referred to as a "C4D") or a contacting conductivity detector having electrodes in contact with the capillary fluid, and/or an optical transmittance/absorbance detector;
h. an isolated C4D supply 116;
i. a high-voltage (HV) fluidics block 118 (which is referred to as a "HV manifold");
j. an optional drain conduit in the form of an HV drain tube 120; or (in place of the drain conduit), a dryer (e.g., air heater and fan) and a drying region (which can be a sponge, a wick or a drying surface) upon which the monitored solution ejected from the capillary (once past the detector 114), is be dried (actively) by passing airflow (from the air heater and fan) past the drying region to dry out the ejected monitored solution to form a solid or precipitate;
k. an HV power supply 122 that supplies HV power;
l. a fan 124;
m. at least one temperature sensor 126;
n. a heater 128;
o. an optional air pump 130, which can be used to mobilise an eluent if the elution jig and ground manifold are separated and/or the elution volume is insufficient to fill the interconnecting tubes;
p. a micro-controller unit (MCU) and input-output (I/O) board 132, including a circuit board with an MCU (also referred to as a "microcontroller" or an "electronic controller");
q. an embedded computer 134;
r. a bulk power supply 136, also referred to as a "low-voltage (LV) power supply" that supplies lower voltage power than the HV power from the HV power supply 122;
s. a mains and/or battery and/or DC supply inlet in the form of an electrical power inlet 138;
t. a thermal zone 140;
u. a safety interlock 142;
v. an optional HV discharge component 144;
w. a debug port 146 for communicating electronically with the board 132;
x. a chassis 148 (also referred to as a "case" or "casing") around the other components of the system 100;
y. one or more HV lines 150;
z. an optical communications link (also referred to as an "optical communications connection") in the form of an optical link 152, which is an optical fibre link including at least one optical fibre;
aa. a valve-and-pump control line 154 from the MCU board 132 to the main fluidics block 108; and
bb. a positive displacement pump control line 156 from the MCU board 132 to the main fluidics block 108.

The method of operation performed by the system 100 described hereinafter—in which the MCU 132 controls and coordinates the other components of the system 100 to perform the automated processing steps (which are the steps below excluding a collection step, an insertion step and an activation step)—includes:
a. the positive displacement pump forcing BGE into the HV capillary 112 to flush the ground manifold with the BGE to position the BGE solution at the LV end of the capillary 112 (in a priming step);
b. the sample trap collecting the sample (in the collection step), i.e., trapping the sample in or on the sample trap within or on a portion of a trapping material with surface characteristics for trapping or adsorbing the sample (including non-sticky traps such as IONSCAN 600 traps, and adhesive traps including an adhesive material), or with a surface structure for trapping or absorbing the sample within the trapping material, including swabbing with the sample trap to trap the sample;
c. inserting the sample trap into the elution jig of the sample input 102 and actuating the elution jig, e.g., manually by mechanically closing the jig by hand, or by requesting (by way of insertion or button press) the machine to automatically close the jig by way of an actuation motor or servo (in the insertion step), and activating (or "initiating") the remaining automated processing steps controlled by the MCU board 132 (in the activation step);
d. the positive displacement pump forcing (or "mobilising") a controlled measure (referred to as a "first volume", which is less than or equal to (<=) 500 micro litres (ul), e.g., 200 ul) of the eluent (which can be referred to as an elution fluid) in the form of a first reagent from the elution reagent container 104 into the elution jig, and forcing the first reagent through, and/or over, and/or or past a swabbed area that includes the portion of the sample trap, to elute the sample, thus forming an eluate (i.e., an eluted sample fluid or eluted sample solution);
e. the filter (which can be the replaceable sample filter) filtering the eluate (in a filtering step), optionally including filtering the eluate in the elution apparatus using the portion of the trapping material;
f. moving the eluate through the degassing system, and the degassing system degassing the eluate (in a degassing step)—and the replaceable sample filter perform both the filtering and degassing steps in one step;
g. moving the degassed eluate (i.e., a degassed sample solution) to the ground manifold such that the degassed eluate is positioned at the LV end of the capillary, i.e., aligning the degassed filtered eluate in front of the LV end of the HV capillary 112 (in an alignment step);
h. the main fluidics block 108 injecting a small portion of ions from the aligned degassed filtered eluate fluid into the capillary 112 by hydrostatic (fluid pressure) injection or a small portion of ions by electro-kinetic (low HV for a few seconds) injection (in an injection step);
i. the main fluidics block 108 flushing any remaining eluate (or sample fluid) surrounding the LV end of the HV capillary 112 to the optional drain 110, and introducing fresh BGE 106 to the LV end of the capillary 112 to replace the flushed sample fluid (in a pre-separation flushing step);
j. the HV fluidics block 118 energizing the HV power supply (for a fixed time, or until output is detected) to separate the sample by applying the full HV voltage to allow the ionic separation to occur, while the MCU 132 monitors and records the output of the C4D 114 (in a separation step);
k. at the end of the separation step, determined by the MCU 132 based on time or by C4D data analysis, the MCU 132 turning the HV off; and
l. the main fluidics block 108 flushing the HV capillary 112 with fresh BGE to clear away remaining separation products, ready for next separation (in a capillary flushing step).

The UI 134 performs a processing method in the method of operation, including:
a. removing the baseline to facilitate later processing;
b. identify the reference ions (i.e., ionic markers in the elution reagent 104);
c. normalising the data amplitude with respect to the internal standard reference ion amplitude;
d. identifying the species of all ionic peaks in the data;
e. calculating the amount of each target ion detected using specific calibration coefficients for each target ionic species;
f. comparing the amount of each target with its species trigger threshold; and
g. if all species are below their trigger threshold, indicating on the user interface i.e., "NO THREAT", i.e., no targets found, otherwise indicating on the user interface i.e., "THREAT".

In operation, system 100 receives a sample. The sample can be acquired from a surface of a target by a sampling apparatus including a sample trap. A person operating the system 100 (who may be referred to as an "operator" or a "user") inserts the sample—or the sample trap including the sample—into the system 100 through the sample input 102. The operator initiates the automated processing steps (also referred to as an "automatic elution process") executed by the system 100 by inserting the sample, and/or by applying a user input (e.g., a manual input) to a user-interface (UI).

The sample input 102 elutes the sample, and presents the sample to the main fluidics block 108. In the automatic elution process, the sample input 102 transfers the sample to a liquid for ingestion by the system 100. An air pump 130 may provide a short, low-pressure pulse to mobilise the eluate and/or the eluent through the sample substrate and to the main fluidics block 108.

The system 100 includes an elution apparatus that includes the sample trap for trapping the sample; and an initial filter for filtering the eluent (also referred to as an "an initial elution fluid") in the elution apparatus. The eluent is directed through the initial filter by the system 100. The sample trap may include a portion of material (which can be referred to as "sample trap material") that traps the sample by adsorption. The sample trap material may include or consist of an adhesive material that traps the sample by adhesion. The initial filter may include the portion of the sample trap material. The portion of the sample trap material that traps the sample may be referred to as "a swabbed area" because it may be used swab an object of interest (e.g., a person's clothing). Accordingly, the sample trap material may have two functions in the elution apparatus: as the trap and as the initial filter. The sample trap material may include an adhesive tape, which may be a commercially available micropore tape (also referred to as "tacky tape"), and/or may include a sample trap from an ion mobility spectrometry based explosive trace detector, e.g., an off-the-shelf sample trap of an unwoven material, a woven material, a sponge material, and/or a polymer material, and/or may include a material having a surface structure that traps the sample.

The elution apparatus includes a plurality of pumps and valves in the main fluidics block 108 to move the eluent and an eluate, wherein the eluate includes an extracted portion of the sample that is extracted by the eluent.

Fluids can include liquids and gases. The eluent, the eluate and the electrolyte fluid described herein can be liquids, i.e., they are in liquid form or liquid phase, and using the liquid phase may be preferable to using a gas phase. The processed sample is filtered of large particulates and debris by one or more filters.

The elution apparatus provides a method whereby particles of interest are migrated by the eluent from the sampling apparatus and into the eluate. The filtered processed sample is also passed through a degassing system to remove gaseous components before the eluate fluid (i.e., the degassed eluate, also known as an eluted degassed sample) is delivered to the capillary main fluidics block 108. The degassing system may consist of either a hydrophobic membrane (simple degassing mechanism) that vents air to atmosphere or a confined chamber (degassing manifold) that has pressure controlled so as to remove gas bubbles from the eluate (which is a solution).

The elution reagent container 104 contains the eluent (also referred to as "Reagent 1"), and the electrolyte reagent container 106 contains an electrolyte fluid (also referred to as "Reagent 2").

The eluate, the eluent and the electrolyte fluid may be referred to as "input fluids" for the main fluidics block 108.

The elution reagent container 104 and the electrolyte reagent container 106 provide storage free from air (in particular, free from oxygen and carbon dioxide) in the form of respective sealed containers. The sealed containers can be collapsible bags. The sealed containers are each separately connected to the main fluidics block 108 by a fluid connector (e.g., a hose or a pipe or plurality thereof). Additionally, a plurality of replaceable 10-micron filters may be used to remove large particles before the fluid enters the ground manifold.

The main fluidics block 108 (or "ground manifold") receives the eluate from the sample input 102. The ground manifold 108 receives the Reagent 1 and the Reagent 2 from the containers 104 and 106 respectively. The main fluidics block 108 presents a sequence of the fluids in respective quantities to the capillary 112 for separation. The ground manifold 108 includes a plurality of valves for fluidic switching, and a plurality of positive displacement pumps for inducing fluidic movement, in order to perform the fluidic processing in the ground manifold. The ground manifold 108 includes fluid pathways and fluid controls to perform flushing of the ground manifold 108 and the capillary in a flushing method.

Sequencing and electronic control of valves and pumps of the main fluidics block 108 are controlled by and performed by the MCU board 132, further described hereinafter.

The drain vessel 110 is in fluidic communication with the main fluidics block 108 to receive waste fluids from the fluidic processing method, i.e., portions of the input fluids that are not delivered to the capillary 112 and optionally fluids that have traversed capillary 112, HV fluidics block 118 and HV drain 120. The drain vessel 110 could include a drain bottle, and/or a flexible bag. The drain vessel 110 can be emptied or swapped out during regular service by a person, e.g., when replenishing and/or replacing the electrolyte and elution reagents.

The capillary 112 provides a fluid-carrying interior for receiving and holding the processed sample, for carrying the processed sample, and as the column for separation of the processed sample—from the main fluidics block 108 to the HV fluidics block 118 through the conductivity test electrodes of C4D 114.

During a method of operation described hereinafter, an HV potential is applied to the capillary 112 (along its length) between an HV electrode and a ground electrode. The HV electrode 118A is embedded in the HV fluidics block 118 (or "HV manifold") by press fitting or comoulding the HV electrode 118A into the HV fluidics block 118. The ground electrode 108A is embedded in the ground manifold 108 by press fitting or comoulding the ground electrode 108A into the ground manifold 108. The voltage potential compels ions in the sample through capillary 112 towards the HV electrode.

The capillary 112 is connected to each manifold 108, 118 using manifold fittings, e.g., using screw fittings and/or other commercially available low-pressure fittings, e.g., Upchurch fittings from IDEX Health & Science, LLC. The capillary includes: a low-voltage (LV) end portion that is connected to the LV manifold 108, and an HV end portion that is connected to the HV manifold 118. There is a generally linear voltage gradient along the length of the capillary 112 of about 133 V/mm.

The selected dimensions of the capillary 112 are such that the capillary 112 occludes easily, and the fluid presented to the capillary must be well filtered (e.g., with a 1.2 micron filter). The capillary 112 can have inside diameter (ID) of about 25-50 microns (micrometers)—e.g., a nominal ID of 25 micron, 30 micron or 50 micron, and an outside diameter (OD) of about 365 micron, e.g., nominally 370 micron that matches the manifold fittings and the internal through-holes of the C4D 114.

The length for the capillary 112 is selected based on the distance required to achieve sufficient ion peak separation (selectivity) at the most rapid pace, e.g., the length can be about 300 mm overall, which allows for the C4D 114 to be mounted at about 270 mm from the ground end, and entry into the fittings at either end of the capillary 112. This length may allow a 1 mm slug length to separate sufficiently under HV potential to provide sufficient resolution between separated ions in the fluid volume to allow algorithmic processing (the slug length is the length of the sample portion in the capillary, which may be referred to as a "slug"). The nominal sample volume is 0.49 nanolitres (nl) for 1 mm length with a 25 um capillary. Variation of 2 micron in diameter means the slug length may vary from 0.857 to 1.182 mm for 0.491 nl (−14.3%/+18.2%). This volume may be altered to optimise sensitivity, specificity and dynamic range.

The detection capillary 112 has an electrical resistance, from end to end, selected in a method of manufacturing described hereinafter.

The capillary 112 is formed of a fused silica tube.

The capillary 112 may be coated internally with a plurality of lining layers to establish correct electro-osmotic flow and reduce signal loss in 3 layers: HDMB, PSS and HDMB layers are applied sequentially using a fluid flushing sequence, as a pre-treatment to the capillary in a post manufacturing step. The BGE within the detection capillary 112 has a fluid resistance (or "drag"), from end to end that is affected by the temperature and the nature of the BGE.

The capillary 112 may have an external Polyimide coating.

The capillary 112 can be supplied as a coil with a natural curvature.

The capillary 122 may be a commercial available tube, e.g., TSP025375 from Polymicro (Molex) or 062710 from SGE.

The chassis 148 includes the thermal zone 140, which is a thermally controlled volume (or space) with the temperature controlled by a temperature control system described hereinafter. The chassis 148 also includes a separate zone (also known as a "main device space") that is exterior to the thermal zone 140: i.e., a space inside the chassis 148 that is outside the thermal zone 140. A thermal zone boundary provides a perimeter of the thermal zone 140 and separates the thermal zone 140 from the main device space. The thermal zone boundary is within the HV enclosure and is maintained using partial air recirculation within the HV enclosure.

The thermal zone 140 is a notional zone within the insulating enclosure where the temperature is held at a nominally constant temperature (e.g., 35 degrees Celsius or 55 degrees Celsius). The thermal zone 140 includes the following components:
a. the capillary 112;
b. the heater 128;
c. the at least one temperature sensor 126;
d. the fan 124;
e. the HV fluidics block 118;
f. the C4D 114;
g. an HV power module 600, described in more detail hereinafter with reference to FIG. 8, on an HV side of the isolated C4D supply 116 (which transits the thermal boundary);
h. optionally an HV side of the HV drain tube 120 (which also transits the thermal boundary); and
i. a portion of the main fluidic block 108 where the capillary fitting screws lie.

The chassis 148 includes one or more manually openable covers (also referred to as "device covers") described hereinafter. The chassis 148 includes insulating walls with a conductive coating to mitigate electrostatic build-up. The safety interlock 142 removes (i.e., decouples) power from the input to the HV power supply if one of the device covers is opened (which can include being removed).

The HV discharge component 144, which may be housed within the HV power supply, which could be embodied as a resistor chain (e.g., six 1-G-ohm 7-kV resistors in series) and/or a normally insulating material including a conductive filler such as to provide the discharge resistor, provides a discharge path so that the HV supply 122 can discharge when the input power is removed, e.g., by the safety interlock 142.

The HV discharge component may be part of the mechanism by which the voltage gradient in the tube is controlled to reduce coronal discharge, control fringing currents and reduce the chance of arc discharge.

When the detector is of type C4D, the C4D 114 measures complex conductivity of fluid in a portion of the capillary 112 that is monitored by the C4D 114: this monitored portion of the capillary 112 passes through the C4D 114. The monitored portion may be referred to as a "monitored section". The C4D 114 surrounds the monitored portion of the capillary 114, at least on two sides, so that the C4D 114 can measure ions passing along and through the capillary 112 at the monitored portion by measurement of complex conductivity changes in the fluid in the monitored portion. The C4D 114 includes two electrodes through which an AC signal is passed, within which the complex conductivity is measured. The monitored portion is defined by the AC electric field between the two electrodes of the C4D 114 coinciding (i.e., corresponding in position) with the fluid-carrying interior of the capillary 112. The portion of the sample which is monitored when it reaches the monitored portion of the capillary 114 is referred to as the "monitored sample portion". The C4D sensor width determines the separation required between molecule groups, e.g., 1 mm.

The C4D 114 is located as close as practical to the HV end of the capillary, typically 10 to 40 mm from the HV end.

The C4D 114 is referenced to the HV potential (i.e., charged at a high voltage equal to the high voltage of the HV fluidics block 118) to avoid or minimise dielectric breakdown of the capillary wall 112, which might occur if a high voltage drop was applied between the fluid in the capillary and the C4D electrodes outside the capillary 112 over the "monitored sample portion". Thus the voltage drop over the capillary wall can be equal to or less than a predetermined dielectric breakdown value specified for the capillary 112. Because the C4D 114 is referenced to the HV potential, the C4D 114 is powered by the isolated power supply 116, and the C4D 114 communicates (i.e., sends and receives electronic signals for data transfer) via an electrically isolating communications connection in the form of the optical link 152 that extends from within the C4D 114 to the MCU board 132.

The isolated C4D supply 116 provides direct-current (DC) isolated power to power the C4D 114. The isolated C4D supply 116 includes an HV portion (receiver) connected to the HV power supply 122 and to the C4D 114. The isolated C4D supply 116 bridges the full HV-potential isolation between the HV side of the system 100 (connected to the HV portion of the isolated C4D supply 116) and the LV side of the system 100. The isolated C4D supply 116 is electrically connected to the bulk power supply 136 on the LV side to transmit power to the C4D 114. The isolated C4D supply 116 and the C4D 114 are electrically bonded at the HV electrode.

The HV fluidics block 118 provides a fluid connection for the HV end portion of the detection capillary 112, a fluid connection for an HV end portion of the optional drain tube 120, and the HV electrode for the detection capillary 112. The HV fluidics block 118 is mounted within the thermal zone 118.

Where fitted, the drain tube 120 and the HV fluidics block 118 provide an electrically conductive fluid path from the HV end portion of the detection capillary 112 to the drain 110. An HV ground ("GND") electrode is connected at an LV end portion of the drain tube 120, i.e., at the "drain end portion", which is at about the same voltage as the drain 110, which is referred to as "low voltage" or "ground voltage". The drain 110 is electrically connected to a low voltage point in the form of the HV GND electrodes 110A, so that the drain 110, and all fluid in the drain 110 (and in the drain end portion of the drain tube 120), remain at LV or ground potential. The drain tube 120 has a length about 2 metres long. The drain tube 120 has an ID about 65 um. The drain tube 120 has an electrical resistance, from end to end, that is about equal to the electrical resistance of the detection capillary 112. The drain tube 120 has a fluid resistance, from end to end, that is selected based on the fluid resistance of the detection capillary 112, e.g., about 0.2 times (or one fifth) the fluid resistance of the detection capillary 112.

The HV supply 122 includes an HV output on its HV side that supplies the high voltage power to the HV manifold 118 and the isolated C4D supply 116 via the HV fluidics block 118. The HV power supply 122 provides the high voltage for the system 100, and the high voltage is selected by balancing requirements of HV management and ion speed, e.g., to be 36-40 kilovolts (kV).

The HV power supply 122 typically provides a low current, under 100 micro Amps (uA).

The HV power supply 122 is mounted outside the thermal zone 140 to reduce the volume of the thermal zone.

The HV power supply 122 is controlled by control signals from the MCU board 132, as described hereinafter. The HV power supply 122 transmits voltage feedback signals and current feedback signals to the MCU board 132 for the purpose of monitoring HV power supply operation. The HV output from the HV power supply 122 is expected to be current limited to provide arc protection. The HV output is connected to the HV electrode 118A in the HV fluidics block 118 so that the high voltage is applied over the length of the capillary 112. The HV GND output is connected to two HV GND electrodes 110A in the drain 110 (which connects to the LV end portion of the optional drain tube 120) and in the main fluidic block 118 respectively. The HV GND output is connected to the metal chassis 148 and the plurality of GND electrodes 108A, 110A.

The HV power supply 122 can have the following parameter values:
a. a DC output voltage of 40 kV DC, adjustable from 0 to 40 kV DC;
b. an output ripple and noise of less than 50 volts peak-to-peak (V pk-pk);
c. EMC that complies to EN55022 (CISPR22) ClassB, FCC Class B,EN61000-4-2,3,4,5,6,8,11; and
d. an operating temperature of −40° C. to +65° C.

The HV power supply 122 can be a commercially available power supply, e.g., a 40A12-P4 from UltraVolt, Inc, USA or UM40P4 from Spellman Inc.

The fan 124 directs air through the heater 128 and then around the capillary 112 to mitigate separation variations caused by changes in capillary 112 temperature.

The at least one temperature sensor 126 is a commercially available component (e.g., a TMP100 from Texas Instruments or a MS8607 from TE Connectivity) that is connected to the MCU board 132 to provide temperature information for a control loop managing a temperature in the thermal zone, as described hereinafter. The temperature may be controlled to a nominal temperature (e.g., 35 degrees Celsius or 55 degrees Celsius) which can be above room temperature.

The heater 128 is an electrical resistance heating element controlled by the MCU board 132, e.g., using electrical signals generated using pulse-width modulation (PWM). The actual power and form factor of this component is selected to have a maximum heat output of 20 Watts which coincides with the maximum power required to maintain a stable temperature throughout the operating temperature range of the device.

The embedded computer 134 can be in the form of a PC with an available operating system, e.g., Microsoft Windows or Linux or can be a robust hardened purpose-built operating system. The embedded computer 134 communicates with the MCU board 132, and provides a platform to run (or execute) a user interface (UI) process to provide the UI. The embedded computer 134 provides a UI for the operator, whereas a person who is developing, testing or debugging the system 100 (referred to as a "developer" or "debugger") can access the MCU board 132 using the debug port 146.

The bulk power supply 136 can be a switchmode power supply (also known as a "switched-mode power supply") that receives AC mains power as input through the electrical power inlet 138, and provides DC voltage (e.g., 12 V) as output suitable for powering the MCU board 132, the fan 124, the HV power supply 122, and the isolated C4D supply 116. The electrical power inlet 138 can connect to, and receive power from, a standard mains socket, e.g., a wall socket, via a standard International Electrotechnical Commission (IEC) mains cable and plug. The bulk power supply 136 can have with the following parameter values:
a. a DC output voltage specified as 12 VDC;
b. an output ripple and noise specified as 120 mV pk-pk;
c. a typical efficiency of 89% measured at 230 VAC input;
d. an AC input voltage of 85-264 VAC;
e. an AC frequency range of 47-63 Hz;
f. safety standards approved to UL 60950-1;
g. electromagnetic compatibility (EMC) that complies to EN55022 (CISPR22) ClassB, FCC Class B, EN61000-3-2,-3;
h. an operating Temperature of −40° C. to +70° C., subject to derating at high temperature; and
i. a size of 159×97×38 mm (length by width by height— L×W×H).

The bulk power supply 136 can also be a low voltage DC to DC converter specified such that an appropriate battery pack can provide the power source to the device. The output DC voltage, (e.g., 12 V) would be suitable for powering the MCU board 132, the fan 124, the HV power supply 122, and the isolated C4D supply 116. The heater 128 may be powered from the battery pack directly to avoid conversion losses.

The bulk power supply 136 can be or incorporate at least elements of a commercially available power supply, e.g., a "HRP-150-12" from MEAN WELL, Taiwan.

The sensitive HV components in the system 100—including the C4D 114, can be electrically enclosed in a Faraday Cage and housed in an HV subassembly.

The MCU and IO board 132 provides electronic interfaces and computing resources to control the other electronic and fluidic components of the system 100. The MCU and IO board 132 controls the elution method described herein by controlling the relevant valves, pumps, and motors in the system 100. The MCU and IO board 132 receives signals representing measurements from the sensors in the system 100, and it communicates with the UI of the embedded computer 134.

The sensors in the system 100 include: the temperature sensor 126; the C4D 114; pressure sensors to monitor pressure at: LV end of the HV capillary, at intermediate points in the ground manifold and air pressure at the Air Pump if fitted.

The MCU and IO board 132 includes a plurality of UARTs, ADC channels, DAC and PWM channels, I2C (Inter-Integrated Circuit) controllers, SPI (Serial Peripheral Interface) interfaces, timers and counters to communicate with the embedded computer 134, the C4D 114, the positive displacement pump or pumps 156, the heater 128, a debugging computer connected at port 146, sensors and power supplies such as the HV power supply 122.

Figure 2:
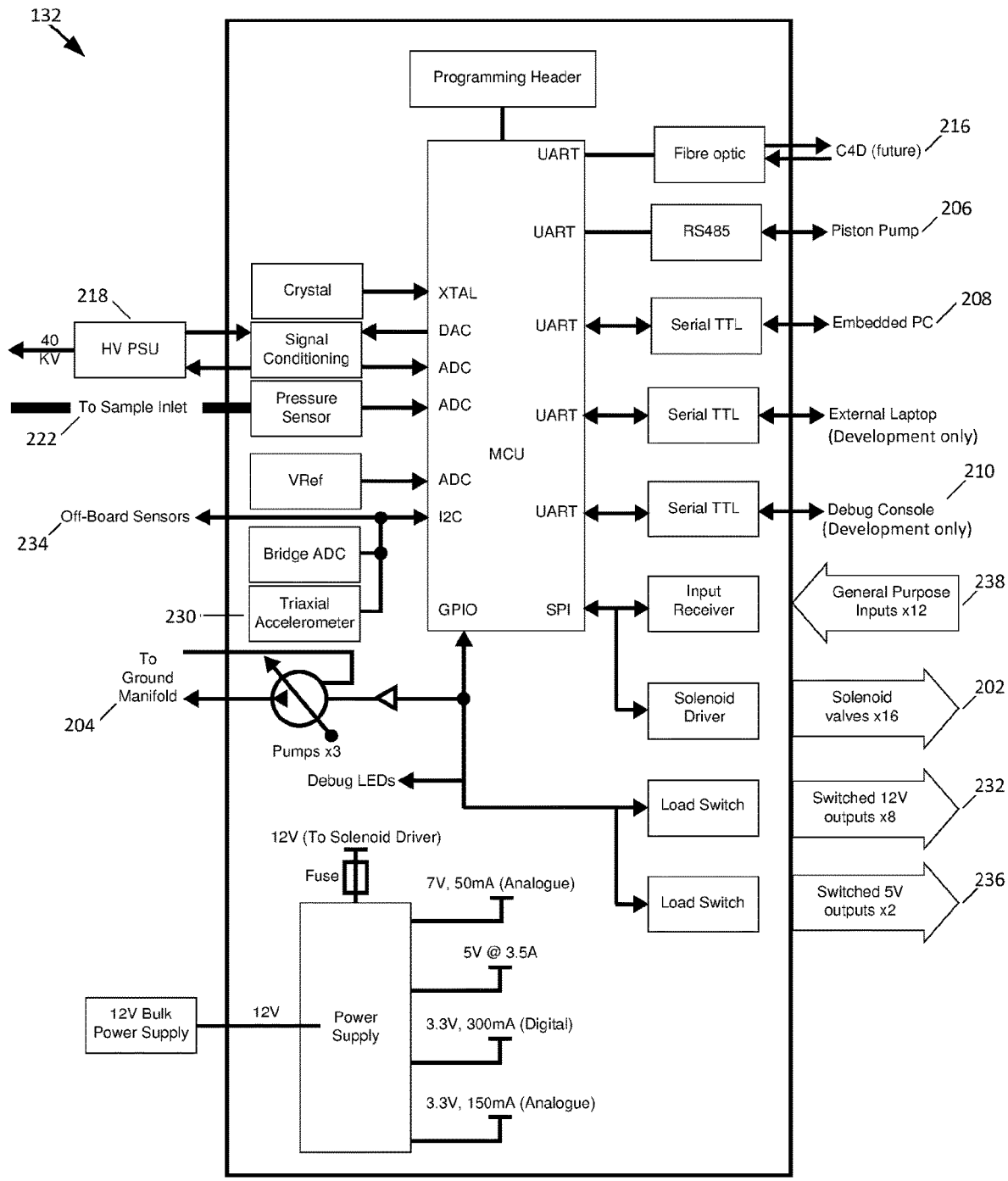
FIG. 2 is a block diagram of a controller board of the system.

In particular, as shown in FIG. 2, the MCU and IO board 132 includes the following interfaces:
 a. plurality of solenoid valve-control interfaces 202 (with respective interface circuitry) that generate signals to send via the valve-and-pump control line 154 to control the main fluidics block 108 in the fluidic processing method;
 b. a pump-control interface that generates signals to send via the positive displacement pump line 156 to control the positive displacement pump or pumps in the fluidic processing method, including positive displacement pump control interface 206;
 c. a plurality of a pump-control interfaces that generate signals to send via the IO board 132 to control interfaces 204 (in the form of PWM interfaces and digital interfaces) to positive displacement pumps;
 d. an interface 208 for communicating with the embedded computer 134 that includes a UART configured to communicate using a serial communications standard, e.g., asynchronous serial;
 e. an interface 232 ("Switched 12V output") for heater control that provides a buffered PWM signal;
 f. an interface 234 ("off board sensors") for at least one temperature sensor 126 that operates according to the I2C standard;
 g. the interface 234 ("off board sensors") for the one pressure sensor on main fluidics block to measure the pressure of, e.g.; the HV capillary, that operates according to the Inter-Integrated Circuit (I2C) standard;
 h. an interface 216 to communicate with the C4D 114 over the optical link 152 that includes a universal asynchronous receiver/transmitter (UART) configured to communicate over the optical link 152;
 i. an interface 218 to send the control signals to the HV power supply 122 to control the HV power supply, e.g.; a DAC with output voltages in a selected range, e.g., 0 to 5 V, corresponding to the input range for the HV power supply;
 j. an interface 218 to receive the voltage feedback signals from the HV power supply 122, e.g.; an ADC with input voltages in a selected range, e.g., 0 to 3 V, corresponding to the ADC input range on the MCU;
 k. an interface 218 to receive the current feedback signals from the HV power supply 122, e.g.; an ADC with input voltages in a selected range, e.g., 0 to 3 V, corresponding to the ADC input range on the MCU; and
 l. an interface 236 ("switched 5V output") to send power to the isolated C4D supply 116.

The MCU (or "microcontroller") can include an ARM Cortex-M4, with 1 MB of embedded Flash memory, 192 KB of SRAM and 64 KB of data RAM. The memory included in the MCU can provide the MCU with zero wait-state access to instructions and data in the RAM at the maximum clock speed, e.g., 168 MHz. The MCU may have sufficient RAM to perform data collection, processing, and data communication with the embedded computer 134. This MCU has input-output interfaces and peripherals to communicate with the other components of the system 100. The MCU can be a commercially available microcontroller, e.g., a STM32F405VGT6 from STMicroelectronics N.V. ("ST"), Switzerland.

An integrated circuit (IC), such as a solenoid driver IC, can be used to connect the low current microcontroller outputs to high current peripherals, and could have the following parameter values and features:
 a. an output current limit between 0.9 and 2.5 A, and typically 1.2 A;
 b. an on resistance of typically 0.55 Ohm, and up to 1.1 Ohm; and
 c. a solenoid current of typically 0.075 A;
 d. fault tolerance features, including over-voltage protection and over-current protection, configuration to withstand a shorted solenoid coil without damage;
 e. thermal shutdown features, i.e., in the event of an over-current fault, the IC switches off when its internal temperature rises too high, and automatically restarts upon removal of the over-current fault;
 f. provision of diagnostic signals representing information about the state of each output, and representing open load and over-voltage conditions;
 g. a controlled slew rate during load switching to mitigate radiated electromagnetic emissions from the IC, mitigate inductive transients from solenoid coils, and reduce the electrical stress on the solenoid driver IC; and
 h. an interface for direct connection to the MCU, and a plurality of control outputs (e.g., 16) for respective peripherals per IC, which allows for fewer component than an equivalent circuit based on MOSFETS and overcurrent mitigation circuitry.

The solenoid driver IC can be a commercially available IC, e.g., a "Freescale" MC33996 from NXP Semiconductors, Netherlands.

An IC, such as a high-side switch IC, can be used to connect the plurality of MCU outputs to interface 232 ("switched 12V Outputs") peripherals requiring high current 12-V loads. The high-current loads include: the HV power supply 122; the Air Pump 130; and the heater 128. This IC could have the following parameter values and features:
 a. an output current limit of up to 9 A (per channel);
 b. an on resistance of typically 0.05 Ohm, and up to 0.1 Ohm;
 c. fault tolerance features, including over-voltage protection and over-current protection, and a configuration to limit output current for a shorted load;
 d. thermal shutdown features, i.e., in the event of an over-current fault, the IC switches off when its internal temperature rises too high, and automatically restarts upon removal of the over-current fault;
 e. provision of diagnostic signals representing information about output current of each output, and representing fault conditions; and
 f. a controlled slew rate (or "slope control") during load switching to mitigate radiated electromagnetic emissions from the IC, mitigate inductive transients from the high-current loads, and reduce the electrical stress on the IC and interference to on-board power supplies.

The high-current 12V interfaces can be a commercially available IC, e.g., a VNQ7050 from ST, Switzerland.

An IC, such as a high-side switch IC, can be used to connect the control signals of the MCU to peripherals requiring 5V power, such as the isolated C4D supply 116. The highside switch can have the following parameter values and characteristics:
 a. an output current limit between 0.5 and 5 A;
 b. an on resistance of typically 0.022 Ohm, with a maximum of 0.035 Ohm;
 c. fault tolerance features, including over-temperature and over-current protection, and a configuration to withstand a shorted output without damage;
 d. diagnostic features, including providing a diagnostic output to the MCU; and
 e. a current output set such that a fault on an output does not interfere with other outputs or otherwise compromise the IO board.

The highside switch IC can be a commercially available IC, e.g., a TPS2557 from Texas Instruments.

General purpose inputs 238 to the MCU ("General Purpose Inputs×12") include a switch detection interface, which may be able to read states of up to 22 inputs, and transfer information representing the read states to the MCU via the SPI interface (in the interface 238, "Input Receiver"). The integrated features may include:
 a. a wetting current: the IC provides a constant current pull-up to 12 V or pull-down to GND on each switch input, and this this provides a known wetting current through the switch contact, which can extend the useful life of the switch contact and improve reliability;
 b. analogue measurement: the IC can switch any input channel to an analogue input pin, allowing the MCU to measure the voltage on any input channel, and this can be used to extend the number of analogue inputs in the MCU board 132; and
 c. fault tolerance: the IC is protected against electrostatic discharge (ESD) and over-voltage on all inputs.

The switch detection interface can include a commercially available IC, e.g., a MC33978 from Freescale Semiconductor.

Figure 3:
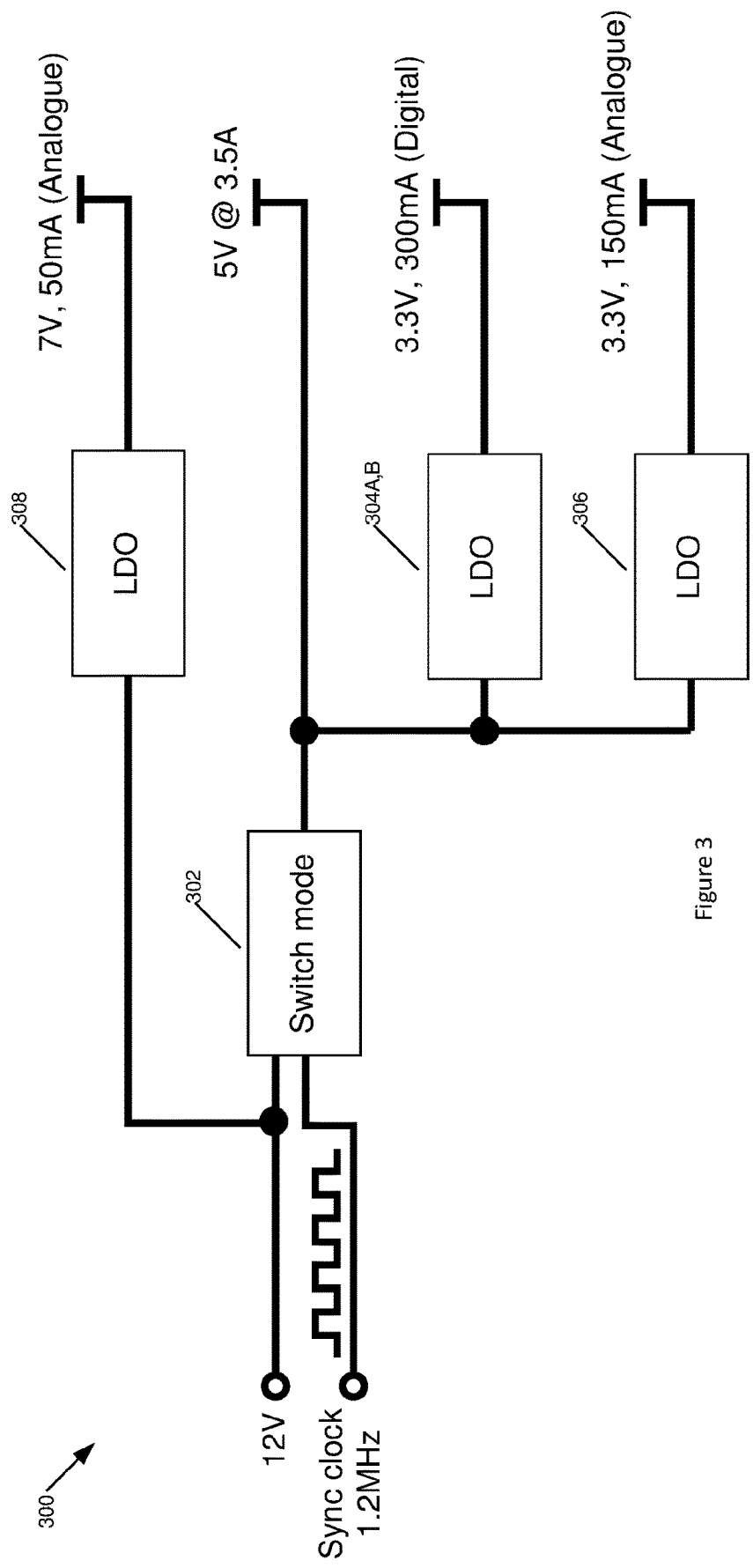
FIG. 3 is a block diagram of a power supply of the controller board.

As shown in FIG. 3, the MCU board 132 includes a plurality of on-board power supplies 300, to convert incoming power from the bulk 12 V power supply 136 to a plurality of lower voltages for use on the MCU board 132. The power supplies 300 include linear (LDO) and switching-type supplies. Low-noise linear regulators are included to provide clean supplies to analogue circuitry, and a switching regulator provides a high-current 5 V supply for various loads which may include:
 a. a 5V power supply 302;
 b. two independent 3.3V digital supplies 304A, 304B at up to 300 mA each;
 c. a 3.3V analogue supply 306; and
 d. a 7V supply 308.

The 5V supply 302 includes one or more synchronous buck regulator ICs (e.g., a commercially available LT8610) to provide 5V or 3.3V at up to 3.5 A that is selected to provide the following features:
 a. an efficiency of over 90% when converting 12 V to 5 V or to 3.3 V;
 b. a "power good" output which controls power-on sequencing of other regulators powered from 5V, so in the event of the 5V supply dropping out, the microcontroller will be cleanly reset; and
 c. a clock input, e.g., to receive signals from an external clock provided by the microcontroller, so that the microcontroller can set the switching frequency such that switching noise does not interfere with other sensitive measurement.

The two independent 3.3V supplies are low-noise supplies, e.g., a dual linear regulator (e.g., a commercially available ISL9012) that is selected to provide the following features:
 a. low output noise because one of the 3.3 V supplies powers analogue circuitry; and
 b. a microcontroller reset because the other 3.3V supplies controls the reset input of the MCU.

The 7V supply is, which may be a low-noise type, can power analogue circuitry on the controller board PCB. A linear regulator (e.g., a commercially available TPS7A4101) or a switching +/−7 V supply may be used to provide up to 50 mA to the operational amplifiers (opamps) in the DAC and other analog components.

As mentioned hereinbefore, the MCU and IO board 132 receives signals representing measurements from the sensors in the system 100, and the sensors in the system 100 include: the temperature sensor 126; the C4D 114; analogue pressure sensor (for example a Wheatstone bridge type); and digital pressure sensors (Inter-Integrated Circuit type).

A sensor bridge interface (or "bridge-sensor interface") may be used to measure Wheatstone bridge type sensors such as a pressure sensor or load cell. The sensor bridge interface has the following features integrated on-chip (to reduce component count and improve performance over a typical multi-chip implementation):
 a. a high-resolution ADC: an integrated 24-bit ADC directly digitizes output from the sensor bridge to the MCU, without the need for a front-end amplifier with scaling and linearity errors;
 b. integrated self-calibration to provide very low drift and offset;
 c. integrated digital filters to reject 50 Hz, 60 Hz, and out-of-band noise; and
 d. an integrated I2C interface so multiple bridge sensors can connect to a single I2C bus of the MCU board 132, thus reducing PCB complexity and external wiring.

The sensor bridge interface may include a commercially available IC, e.g., a LT2485 from Linear Technology.

If a degassing manifold is used instead of the simple degassing filter, as described hereinbefore, a pressure sensor is required to maintain the absolute pressure in a vacuum accumulator. The pressure sensor may be mounted on the MCU board 132 to minimize electrical wiring and sensitivity to electrical noise. The pressure sensor includes a piezoresistive sensing element. The pressure sensor is calibrated and temperature compensated. The pressure sensor provides an output directly proportional to pressure, and to supply voltage. The pressure sensor is housed in a dual in-line package (DIP) that is soldered directly to the PCB of the MCU board 132. The pressure sensor has a barbed port protruding from a side of its case body to connect to a flexible tubing that is connected to the output of the air/vacuum pump 130. The pressure sensor can be a commercially available IC, e.g., a HSCDRNN030PAAA3 from Honeywell.

As shown in FIG. 2, the MCU board 132 includes a 3-axis accelerometer circuit 230 (including three linear accelerometers or transducers aligned in 3 orthogonal dimensions) that the system 100 uses to determine whether the chassis 148 is on a level surface, i.e., a surface transverse to gravity. It may be desirable to operate the system 100 in a selected orientation (i.e., not tilted) to maintain normal hydrostatic operating conditions and correct operation of the Sample Input block 102. The accelerometer circuit 230 provides electronic signals representing X, Y, and Z-axis acceleration information to the MCU, which determines a degree of tilt by analysing the orientation of gravity. The accelerometer circuit 230 may be mounted on the MCU board 132, including an I2C interface for communicating with the MCU over the I2C bus. The accelerometer circuit 230 include a commercially available accelerometer, e.g., a MMA8451Q from Freescale.

The C4D 114 measures the electrical complex conductivity of the fluid within the monitored portion, as described hereinbefore. The monitored portion is a section of the capillary 112. The C4D 114 measures a magnitude and a phase of a variable frequency sinusoidal AC stimulus applied to the monitored portion by capacitively coupled electrodes.

Figure 4:
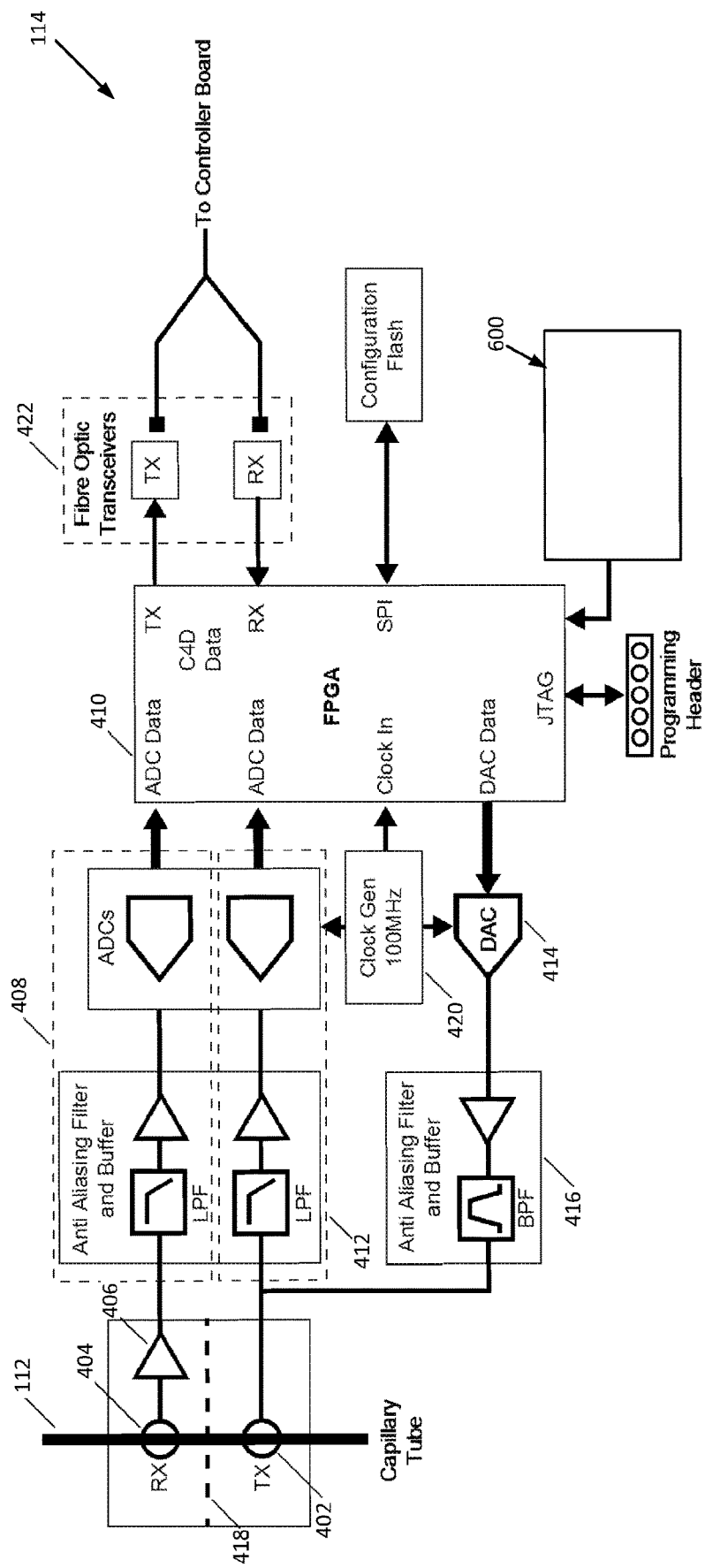
FIG. 4 is a block diagram of the detector of the system.

As shown in FIG. 4, the capacitively coupled electrodes are a pair of electrodes forming the capacitor described hereinbefore: a transmit (Tx) electrode 402 and a receive (Rx) electrode 404. The Tx electrode 402 and the Rx electrode 404 may be manufactured as Printed Circuit Board (PCB) assemblies. The capacitively coupled electrodes may be plated through-holes on printed circuit board with the capillary 112 threaded through them, and spaced a small distance apart, e.g., 1 mm, by a non-conductive spacing material sandwiched between the PCBs. The C4D 114 includes an electrical screen 418 (also referred to as an "active shield") mounted between the Tx and Rx electrodes 402,404 to reduce unwanted crosstalk between the two electrodes 402,404. The electrical screen 418 is an earth plane on both the Tx and Rx PCBs.

The AC stimulus includes a sinusoidal stimulation waveform (referred to as a "Tx signal") that is sent to the Tx electrode 402, and a resulting AC current is measured at the Rx electrode 404. The resulting AC current is representative of and proportional to the fluid complex conductivity in the monitored portion.

The Tx signal has a frequency, and this frequency is selected based on geometries of the Tx and Rx electrodes 402,404 to provide the best discrimination and sensitivity, and noise immunity, e.g., nominally 1.001 MHz.

An Rx signal from the Rx electrode 404 is in the form of a sensed current, which is very small, <2 uA, so—as shown in FIG. 4—the C4D 114 includes an Rx amplifier 406 in the form of a low-noise transimpedance amplifier to amplify the Rx signal from the Rx electrode 404 and convert it to an Rx voltage signal.

The C4D 114 includes an Rx ADC circuit 408 (including an anti-aliasing filter, buffer and ADC) that receives the Rx voltage signal from the Rx amplifier 406, digitizes (or "samples") the Rx voltage signal, and transmits the resulting digitized Rx signal to a C4D processor 410. The Rx ADC circuit 408 is a high-speed converter 100 megasamples per second (MSps).

The C4D processor 410 continuously reads (or receives) signals from the ADC circuits 408, 412, and continuously executes a C4D signal processing method (described hereinafter) to filter and translate these received digital signals, and to extract complex conductivity information (i.e., complex conductivity values) of the monitored portion. The C4D processor 410 generates and sends signals representing the extracted complex conductivity information to the MCU board 132 via the optical link 152. The C4D processor 410 includes a field-programmable gate array (FPGA) configured to perform the C4D signal processing method, including to filter the digitized Rx signal, and convert the resulting filtered digital Rx signal to magnitude and phase information (represented by electronic magnitude and phase signals).

The C4D 114 includes a Tx DAC 414 connected to the C4D processor 410. The C4D processor 410 drives the Tx DAC 414 to generate an excitation signal (e.g., a 1.001 MHz sine wave) for the Tx electrode 402. The excitation signal has high amplitude (e.g., 25 V pk-pk) to improve the signal-to-noise ratio at the Rx electrode 404. The excitation signal from the DAC 414 is passed through a Tx filter circuit 416 to generate the Tx signal for the Tx electrode 402 and the Tx ADC circuit 412.

The C4D 114 includes a Tx ADC circuit 412 (including an anti-aliasing filter, buffer and ADC, which are similar to the anti-aliasing filter, buffer and ADC of the Rx ADC circuit 408) that also receives the Tx signal, i.e., the same Tx signal sent to the Tx electrode 402. The Tx ADC circuit 412 digitizes the Tx signal, and transmits the resulting digitized Tx signal to the C4D processor 410, which uses the digitized Tx signal to compensate for gain errors and temperature drift within the analogue sections between the Tx DAC and the Rx ADC of the C4D 114 in the C4D signal processing method.

An auxiliary low speed ADC not shown in FIG. 4 measures the C4D supply voltages within the C4D 114, and the resulting measured supply voltages may be used to correct for the effect of power supply fluctuations through signal correlations in the C4D processing method. The auxiliary ADC can communicate with the C4D controller 410 via an SPI interface, and can be a commercially available ADC IC, e.g., the Linear Technology LTC1408.

The DAC 414 is run at the same sample rate as the ADC circuits 408,412 to mitigate creation of spurious harmonics or image products. The DAC can have differential current output. To convert current into voltage, the DAC outputs are terminated with resistors to Ground. The DAC can be a commercially available DAC, e.g., the Analog Devices AD9704.

The coupling between the Tx and Rx electrodes 402,404 is of high resistance; the Tx electrode 402 is driven with the high amplitude to improve SNR. The excitation signal from the DAC 414 has high frequency noise from the sampling clock 420 that is filtered out by the Tx filter circuit 416.

Figure 6:
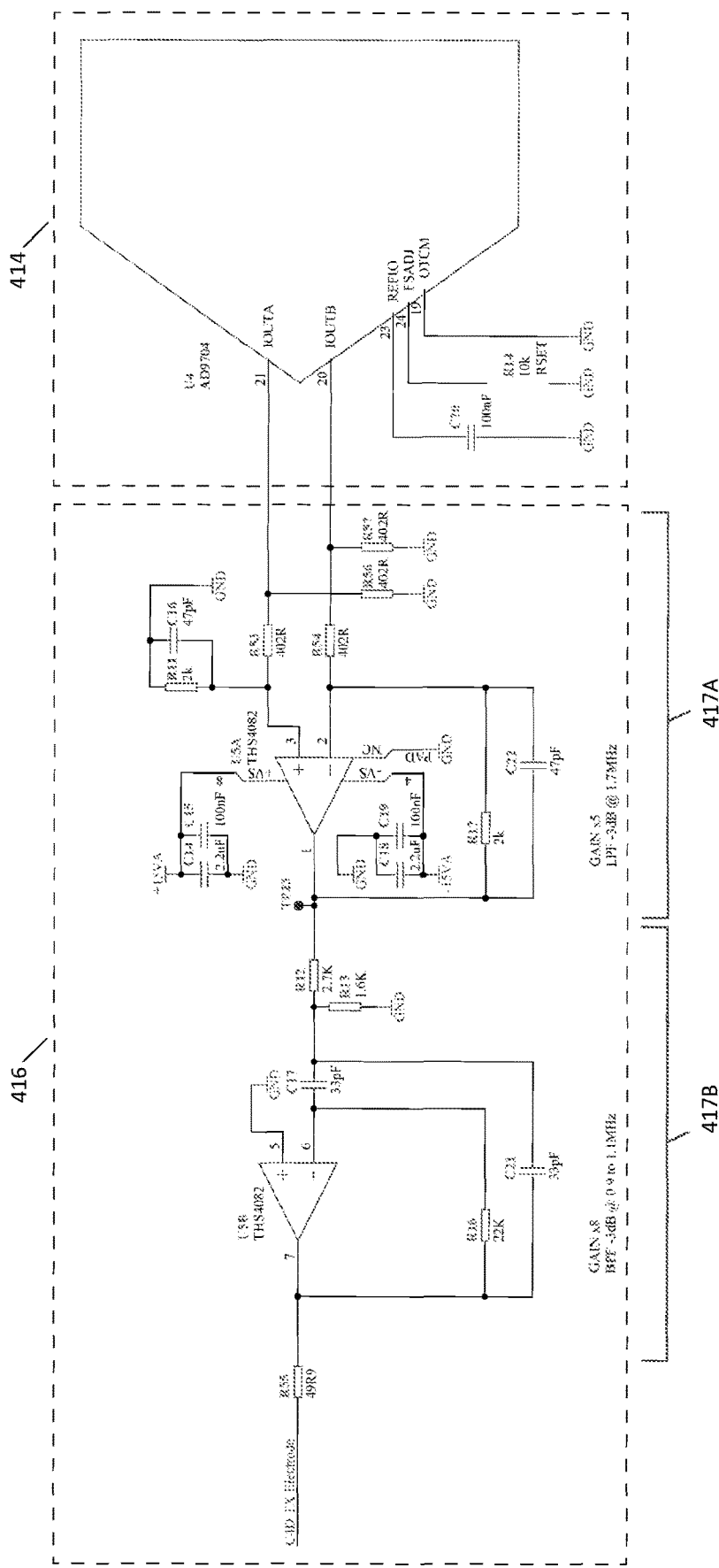
FIG. 6 is a circuit diagram of a transmit filter circuit of the detector.

As shown in FIG. 6, the Tx filter circuit 416 is a two-stage filter including: an anti-aliasing filter in the form of a low-pass filter (LPF) 417A; and band-pass filter (BPF) 417B that provides a band-pass filter and a buffer. Differential outputs of the DAC 414 are terminated in load resistors of the Tx filter circuit 416 in the (LPF) 417A, giving a nominal full-scale voltage (e.g., ±400 mV) on each output. The nominal gains of the two-stage filter are selected to drive an output opamp of the Tx filter circuit 416 to full scale without clipping (e.g., approximately 25 V pk-pk). The output opamp of the Tx filter circuit 416 in the BPF 417B has a resistive series termination R55 (e.g., 50Ω) to isolate the output opamp from: (i) the capacitance of the Tx electrode 402; and (ii) PCB tracking. The output opamp of the Tx filter circuit 416 may be a dual opamp which runs from a ±15 V power supply, which is fast with low noise (175 MHz GBW, 230 V/us slew rate, 10 nanovolt per square-root Hertz—nV/√Hz), with high output drive. The output opamp of the Tx filter circuit 416 may be a commercially available opamp, e.g., TI THS4082.

Figure 7:
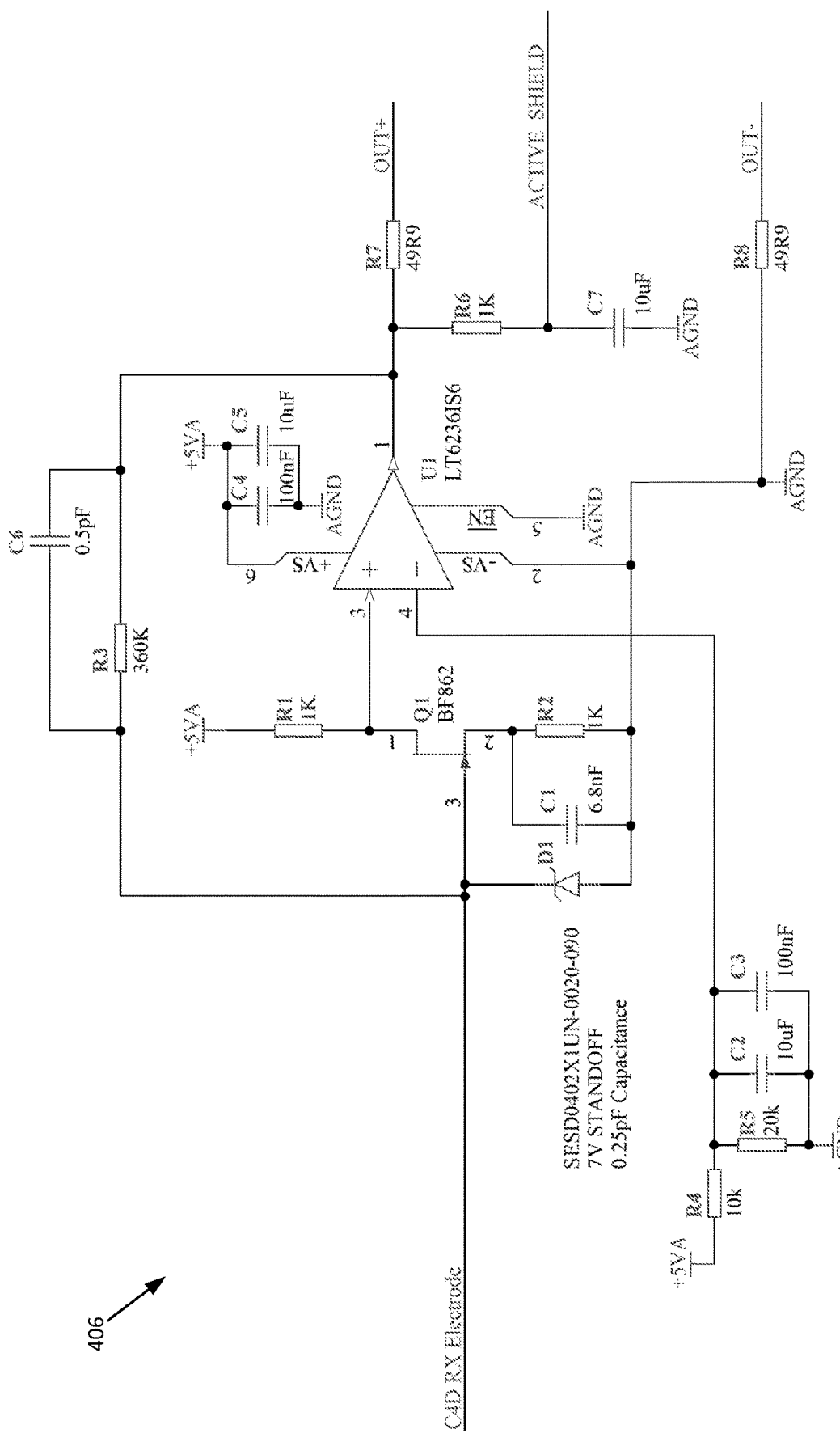
FIG. 7 is a circuit diagram of a transimpedance amplifier of the detector.

As shown in FIG. 7, the Rx amplifier 406 includes a low-noise JFET transistor as a front-end buffer, followed by an opamp stage. The JFET can have lower noise than the opamp stage, so the hybrid circuit may have better performance than the opamp stage alone. The gain of the circuit Rx amplifier 406 is set to give, e.g.; an output of 100 mV per uA of input current. The opamp can be an opamp that is fast (e.g., 215 MHz GBW, 70 V/us), with very low voltage noise (e.g., 1.1 nV/√Hz), e.g., a commercially available opamp, e.g., the LT 6236IS6. To mitigate effects of stray capacitance at the input node, the screen 418 (or "active shield") is placed over the opamp circuitry in the Rx amplifier 406. The screen 418 is driven with the DC component of the output of the Rx amplifier 406, so any stray capacitance from the screen 418 to the input node is effectively uncharged. A low-pass filter removes the high-frequency component of the output, leaving the DC voltage to drive the screen 418.

The ADC circuits 408,412 include a dual-channel ADC that allows the transmit signals and the receive signals to be simultaneously sampled for differential noise rejection. The dual-channel ADC has sufficient sample rate and precision to achieve the target SNR. As described hereinafter, subsequent filtering and decimation in the C4D controller 410 produces an output at a lower sample rate but with greater precision as described in over-sampling theory. The dual-channel ADC can be a commercially available ADC, e.g., the Maxim MAX19516.

The ADC circuits 408,412 each include the anti-aliasing filter and the buffer to drive the input of each ADC. The anti-aliasing filter rolls off frequencies above the Nyquist frequency of the ADC which would otherwise create unwanted images within the sampled data, in particular noise that creates an image frequency at the same frequency as the signal being measured (e.g., 100−99=1 MHz). The anti-aliasing filter attenuates this noise to reduce its effect on the C4D measurement. The input impedances on the positive and negative input pins of the opamp are matched to provide the common-mode rejection. The opamp may be a commercially available opamp, e.g., the TI THS4521.

Figure 8:
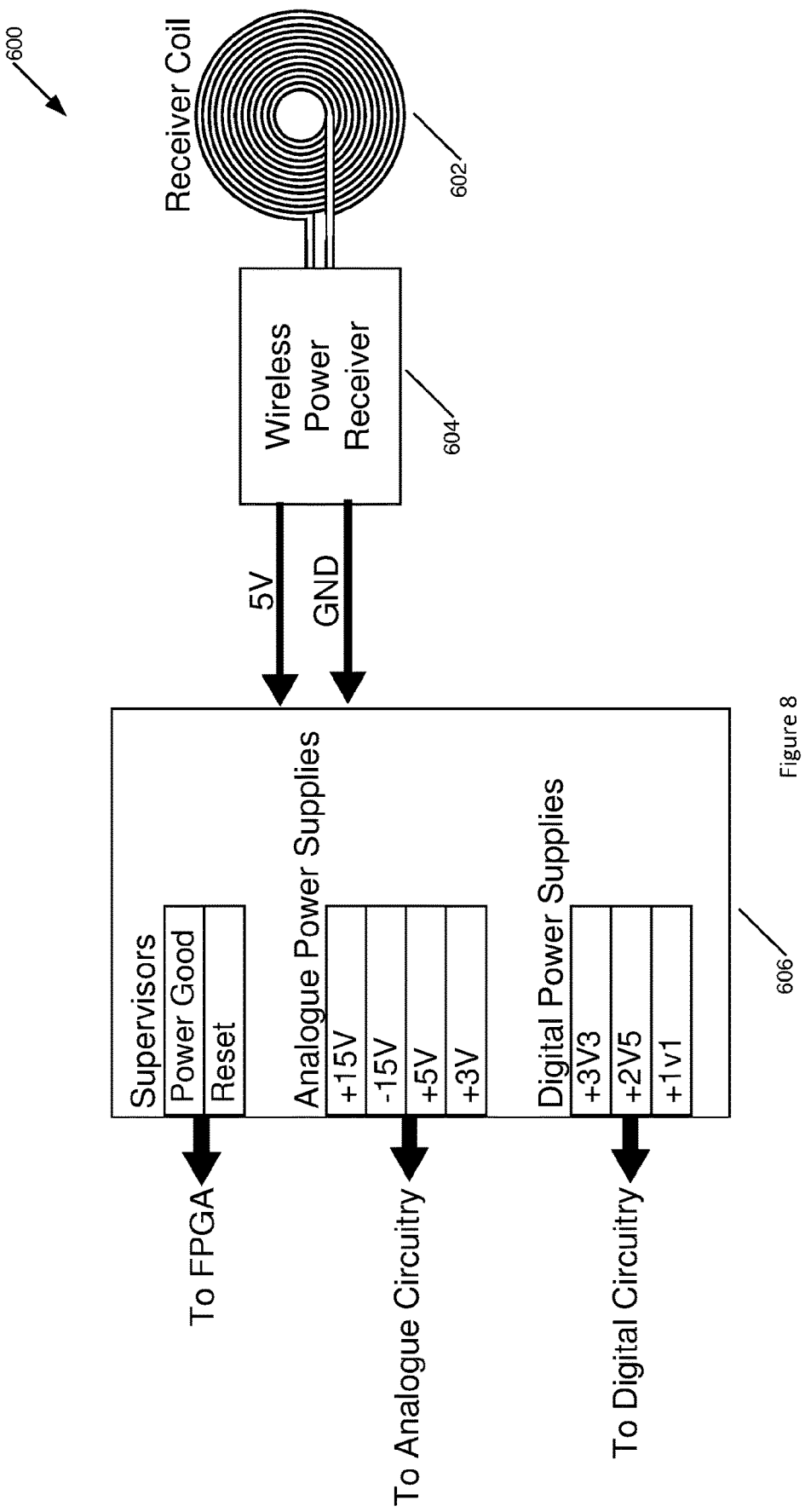
FIG. 8 is a schematic diagram of a power supply for the detector.

As shown in FIG. 8, the C4D 114 receives power from a plurality of different power supplies in the HV power module 600 of the isolated C4D supply 116.

The isolated C4D supply 116 includes: a wireless power transmitter module mounted outside the insulating enclosure 140 and a receiver module mounted on the exterior of the C4D 114. The insulating enclosure surrounding the C4D module provides isolation between the transmitter module (at LV) and the receiver module (at HV) providing a minimum of 60 kilovolts (kV) isolation between the LV and HV sides. The insulation may be of an insulating type (e.g., 10 mm thick clear PVC with creepage distances greater than 170 mm). A receiver coil 602 of the receiver module can be the same physical size as a transmitter coil of the transmitted module for improved coupling efficiency and separation tolerance over differently sized coils. The wireless power transfer modules can provide +5 V at up to 1 A to the C4D module, and can be based on commercially available modules, e.g., Wurth bq500212AEVN-550 (transmitter) and bq51013BEVM-764 (receiver).

As shown in FIG. 8, the HV power module 600 of the isolated C4D supply 116 includes a wireless power supply receiver 606 that receives power from the receiver coil 602, and provides power (e.g., ground and +5 V) to output power supplies 606.

As shown in FIG. 8, the output power supplies 606 of the isolated C4D supply 116 include an analogue (low noise) power supply (e.g., 3 V at up to 100 mA) to power the front end of the ADC and the opamp buffers in the C4D. The analogue (low noise) power supply has an enable input controlled by the voltage supervisor IC, so in the event of the supply from the wireless power receiver 604 browning out, the analogue (low noise) power supply is cleanly restarted. The analogue (low noise) power supply can include a linear regulator IC, and can be a commercially available IC, e.g., U11, ADP151-3.0V.

As shown in FIG. 8, the output power supplies 606 of the isolated C4D supply 116 include a low-noise power supply for the Rx amplifier 406. This power supply includes a boost converter is to provide a higher intermediate voltage (e.g., 6 V) than the input from the wireless power receiver 604 (e.g., 5 V) that is subsequently regulated down (e.g., to 5V) by a low-noise linear regulator. The boost converter has a synchronisation input (so the switching frequency can be locked to an external reference from the C4D controller 410) to mitigate switching noise from the voltage regulator within the measurement bandwidth of the C4D 114. The boost converter has an enable input controlled by the voltage supervisor IC, so in the event of the supply from the wireless power receiver 604 browning out, the analogue (low noise) power supply is cleanly restarted. The boost converter can be a commercially available converter, e.g., the Texas Instruments TPS55340. The linear regulator can have low noise because it powers the front-end amplifier. The linear regulator can have an input voltage range compatible with the boost converter output (e.g., 6 V). The linear regulator can be a commercially available regulator, e.g., Analog Devices ADP7142-5.0V.

As shown in FIG. 8, the output power supplies 606 of the isolated C4D supply 116 include a core power supply for the C4D controller 410. The core power supply is selected based on specific power requirements of the C4D controller 410. For a C4D controller 410 in the form an Altera Cyclone V FPGA, which requires a 1.1 V power supply for its programmable digital core, the core power supply can be a commercially available module, e.g.; an EN6337QI.

As shown in FIG. 8, the output power supplies 606 of the isolated C4D supply 116 include a digital power supply for components of the C4D processor 410, including internal PLLs, and IO banks communicating with the ADCs 408,412 and the DAC 414. This digital power supply can provide 2.5 V supply. The power supply module can be a commercially available module, e.g., the Altera EP53A8HQI.

As shown in FIG. 8, the output power supplies 606 of the isolated C4D supply 116 include a digital supply to power miscellaneous digital circuitry and components on the C4D board (e.g., at 3.3 V). These miscellaneous components include configuration flash memory of the C4D processor 410, a JTAG interface, the clock generator 420, and optical transceiver 422 (which can be a fibre optic transceiver, or a free-space optical transceiver, e.g., an LED and photodetector).

As shown in FIG. 8, the output power supplies 606 of the isolated C4D supply 116 include an analogue transmit-buffer supply to power the transmit buffer electronics, e.g., a PCB mounted module (U8, NTA0515MC), providing +/−15 V at up to 33 mA. The analogue transmit-buffer supply includes a passive L-C network to provide a clean power supply to the opamps.

The digital power supply, the miscellaneous digital supply and the analogue transmit-buffer supply can all be provided by a single power supply module, e.g., the Altera EP53A8HQI.

As shown in FIG. 4, the C4D 114 includes the optical transceiver 422 for communicating over the optical link 152. Due to the presence of the high voltage (e.g., 40 kV) at the C4D electronics, communication with the MCU board 132 is over the electrically isolating asynchronous serial optical link 152. The optical link 152 may include a pair of plastic optical fibres. The optical link 152 may include or be an optically transparent section of the HV enclosure. The optical transceiver 422 includes an optical transmitter and an optical receiver. The optical transceiver 422 can be in the form of one or more modules on the C4D PCB. The optical transmitter/receiver modules have:

a. operational wavelength that are compatible with plastic fibre optic cables or transparent enclosure (e.g., visible red, e.g., 650 nm);
b. integrated optical connectors or locators to mate with the optical cables or enclosure;
c. direct logic connections to the C4D processor 410, e.g., 3.3 V CMOS logic; and
d. a data rate sufficient to transfer all required data, e.g., of about 3 Mbps.

The optical transceiver 422 may include commercially available modules, e.g., an Everlight part number (p/n) PLT133/T10 W or SunLED XZM2ACR78 W transmitter and an Everlight p/n PLR135/T10 receiver.

The C4D processor 410 provides the following features:
a. sufficient functionality to implement the C4D signal processing method described hereinafter;
b. low power consumption;
c. suitable packaging for the C4D PCB; and
d. a suitable temperature range, e.g., an industrial temperature range device (−40° C. to +85° C.).

Figure 5:
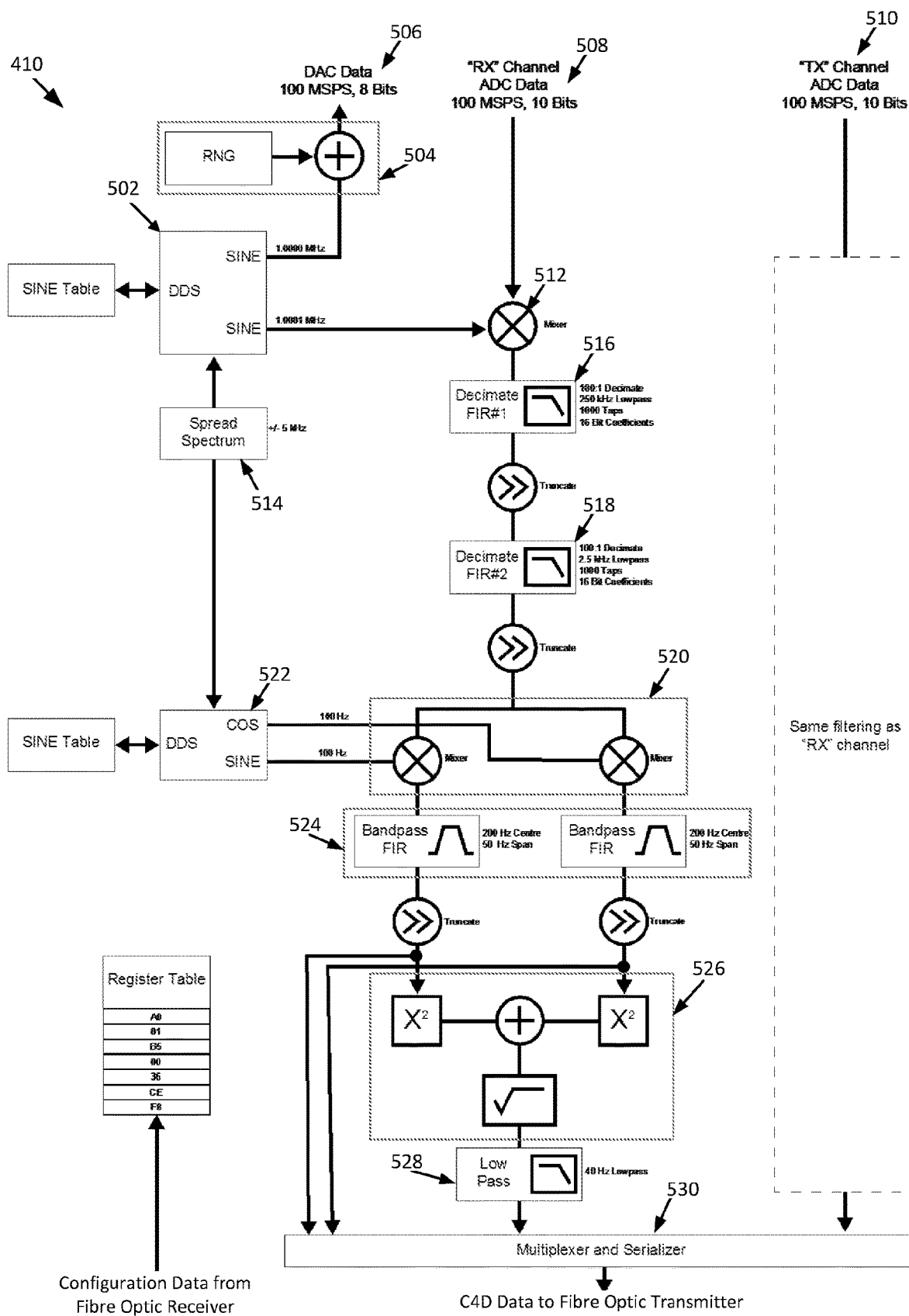
FIG. 5 is a block diagram of digital signal-processing modules in the detector.

As shown in FIG. 5, the C4D processor 410 includes phase-sensitive detectors to separate in-phase ("I") and quadrature ("Q") signal components of both the detected Rx signals and the detected Tx signals (also referred to as the "noise").

The C4D processor 410 continuously executes the C4D signal processing method to filter and translate the received digital signals, and to mathematically extract conductivity information (i.e., conductivity values) of the monitored portion.

In the C4D signal processing method, the C4D processor 410 performs the following functions:
a. generating data representing the excitation signal;
b. controlling the ADC circuits 408,412 and the DAC 414 for configuration and communication;
c. extracting the complex conductivity information (i.e., complex conductivity values) from the data streaming from the ADC circuits 408,412; and
d. communicating with the MCU over the optical link 152.

As shown in FIG. 5, in the C4D signal processing method, the C4D processor 410 produces signals representing an excitation sine wave and a mixing sine wave at high frequencies (e.g.; 1.0000 MHz and 1.0001 MHz), using DDS (direct digital synthesis) in a DDS module 502, at a sample rate substantially higher than the sine wave frequencies, e.g.; 100 MHz. The processor 410 uses the excitation sine wave to generate a transmit (or "excitation") signal 506, which is sent through a DAC-output port to the DAC 414. The processor 410 uses the mixing sine wave to generate a mixing signal for use in a receive processing path described hereinafter. A low-level (e.g.; 0.5 or 1 bit) pseudo-random noise signal is generated by a random number generator (RNG) and summed by an adder ("+") into the excitation signal by a RNG-adder module 504. The added noise signal can reduce harmonic effects of DAC quantisation in the DAC 414. As shown in FIG. 4, the transmit signal 506 is passed from the DAC 414 to the Tx filter circuit 416, then split into two paths: (1) a physical transmission path through the transmit electrode 402 to the receive electrode 404 and to the Rx ADC circuit 408; and (2) a simulated transmission path, through attenuator and filter electronic components in the Tx ADC circuit 412, simulating at least part of the physical transmission path. Two resulting receive signals 508 and 510—from the Rx ADC circuit 408 and the Tx ADC circuit 412 respectively—are received by the processor 410 and processed identically as described hereinafter, giving four output signals at an optical serial link 530 (these four output signals represent: phase and magnitude through the physical transmission path, and phase and magnitude through the simulated transmission path) such that differential noise cancellation can be applied during processing to create an electropherogram.

Each receive signal (508 and 510) is arithmetically multiplied by the mixing signal, using mixer 512, to reduce the excitation frequency component of the receive signals to an IF (intermediate frequency), e.g.; from 1 MHz to 100 Hz. This enables a reduction in the number of calculations per second required in the following signal-processing steps. To reduce the radiated electromagnetic interference, and to reduce the effect of received electromagnetic interference, a frequency modulation "Spread Spectrum" is added to the excitation and mixing signals by a spread-spectrum component 514 such that the excitation frequency is rapidly shifted across a small range, e.g.; 1 kHz. Adding the spread spectrum frequency modulation to both the excitation and mixing signals results in a cancellation of the frequency modulation such that the output of mixer 512 has a single unmodulated frequency component once again.

Two decimation and low-pass filter steps are performed in series, by decimating filters 516 and 518, to reduce the sample rate to a manageable frequency, e.g.; from 100 MHz to 10 kHz. The IF signal is then mixed (by mixers 520) with sine waves having a differential phase of 90 degrees (in-phase and quadrature or I and Q mixing signals, produced by a DDS module 522). This mixing step effectively increases the signal-to-noise ratio of the final result by way of producing phase and magnitude components of the receive signal which can be ascertained at the reduced sample rate rather than only at the maxima, minima and zero-crossing points of the IF sine wave. The I and Q signals are band-pass filtered by filter 524, centred at the frequency result of mixers 520, which is the sum of the IF and the I/Q mix frequencies (such as 100 Hz and 100 Hz, producing 200 Hz). The processing performed by processing block 526—including an arctangent application, quadrant detection, and differentiation—determines changes in phase (not shown in FIG. 5). The processing performed by processing block 526—including a square application, a sum and a square root—determines magnitude. The magnitude signals and differentiated phase signals from the processing block 526 are further low-pass filtered by filter 528 before being passed through the optical serial link 530. The resulting information passed to the user interface becomes an electropherogram signal containing the conductivity of the fluid as it passes the electrodes 402, 404, representing the quantities of analytes in the eluate.

The C4D processor 410 may be a commercially available FPGA, e.g., the Altera Cyclone V p/n 5CEFA5U19I7N in a 19×19 mm BGA package.

Figure 9:
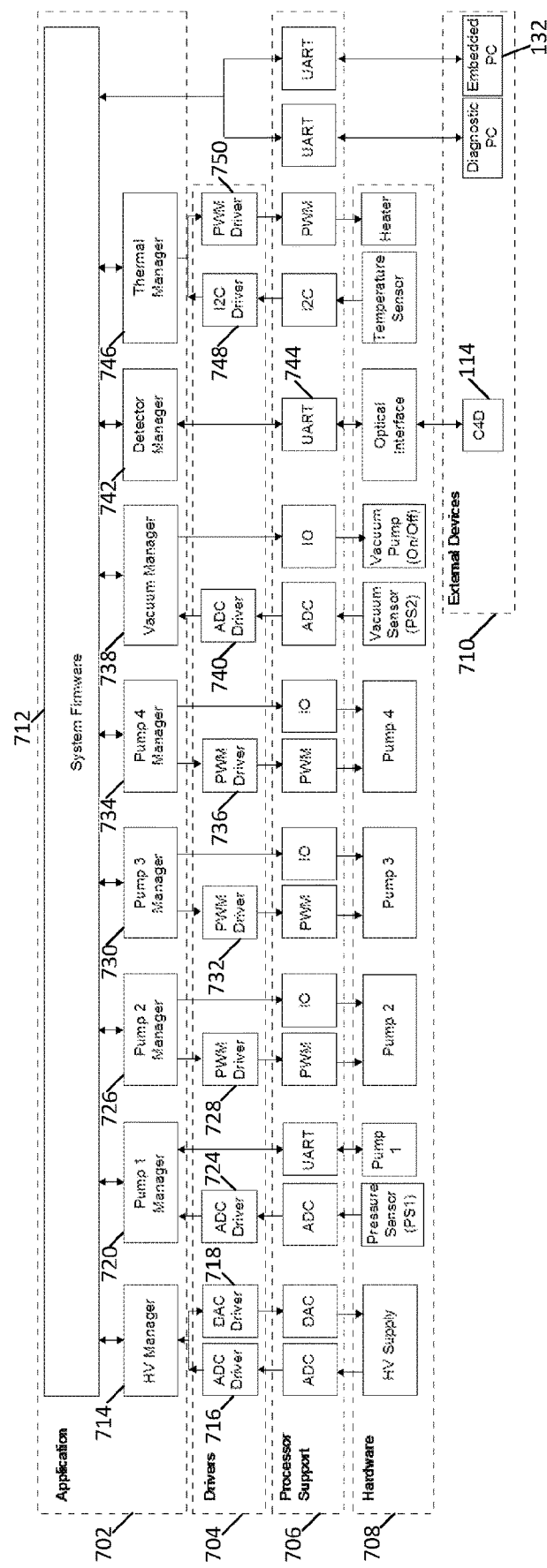
FIG. 9 is a block diagram of a firmware architecture of the system.

As shown in FIG. 9, the MCU includes the following includes the following software layers:
a. an application logic layer 702;
b. a driver layer 704;
c. a hardware abstraction layer (HAL) 706;
d. a hardware layer 708; and
e. an external devices layer 710.

The application logic layer 702 controls and coordinates activity of the system 100, including: initializing drivers, processing events, reading and recording sensor data. Each application in the application logic layer 702 is implemented as a separate task to provide isolation between application layer components.

As shown in FIG. 9, the application logic layer 702 includes a system firmware module 712 that manages overall coordination of the modules in the application logic layer 702, and manages communications with the embedded computer 134 and/or an external computer (via the debug port 146). The system firmware module 712 receives inputs including: (i) script commands from the embedded computer 134; (ii) commands from the external (diagnostic) computer; and (iii) outputs from firmware managers. The system firmware module 712 generates outputs including: (i) responses and data to the embedded computer 134; (ii) responses and data to diagnostic computer; and (iii) commands to the firmware managers (script input).

As shown in FIG. 9, the application logic layer 702 includes an HV manager module 714 that controls closed loop control of the HV Power Supply 122. The HV manager module 714 takes the following inputs: a target HV voltage from a controlling script; HV voltage feedback from the HV power supply 122 (via an ADC Driver 716); an HV current feedback from the HV power supply 122 (via the ADC Driver 716). The HV manager module 714 may generate a control signal to the HV Power Supply 122 (e.g., via a DAC Driver 718).

As shown in FIG. 9, the application logic layer 702 includes Pump Manager modules 720, 726, 730, 734 which handle the interface to positive displacement pumps. The pump manager modules use target flow/volume/torque values from the controlling script; flow and volume feedback from the pump; and pressure feedback from the pressure sensors to generate signals to the pumps via drivers 724, 728, 732, 736.

As shown in FIG. 9, the application logic layer 702 includes a vacuum manager module 738 that handles the closed loop control of the Vacuum Supply if a degassing manifold is utilised. The vacuum manager module 738 takes the following input(s): target vacuum range (preset or from configuration); and vacuum feedback from the vacuum sensor (via ADC Driver 740). The vacuum manager module 738 generates the following output(s): on/off control of the Vacuum Pump; and on/off control of vacuum valves.

As shown in FIG. 9, the application logic layer 702 includes a detector manager module 742 handles the interface (via UART 744) to the C4D 114. The detector manager module 742 receives conductivity information from the C4D and passes it to the UI. The detector manager module 742 also maintains the register settings in the C4D as these are lost if the C4D is unpowered.

As shown in FIG. 9, the application logic layer 702 includes a thermal manager module 746 that handles closed loop control of the temperature in the thermal zone 140. The thermal manager module 746 takes the following input(s): a target temperature (preset or from configuration); and a temperature from the temperature sensor 126 via a I2C Driver 748. The thermal manager module 746 generates the following output(s): control of the heater 128 (via a PWM Driver 750).

The C4D and the optional HV drain have significant space and electrical isolation from other elements to get proper electrical isolation and are mounted using high impedance materials such as inert polymers or ceramics. Allowance for an isolated data signal is required in the mounting arrangement.

Interpretation

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The invention claimed is:

1. An elution apparatus including:
    a sample trap configured to trap a sample;
    one or more pumps and/or valves configured to move a liquid eluent and a liquid eluate, wherein the eluate includes an extracted portion of the sample that is extracted by the eluent, the pumps including a positive displacement pump configured to mobilise a first volume of the eluent through and/or over and/or past a swabbed area that includes a portion of the sample trap;
    an electronic controller configured to control the one or more pumps and/or valves to move the eluate;
    one or more filters configured to filter the eluate of large particulates and debris;
    a degassing system configured to degas the eluate; and
    a capillary with a Low-Voltage (LV) end, wherein the one or more pumps and/or valves are configured to move the degassed eluate to the LV end of the capillary for capillary electrophoresis, and
    wherein the sample trap includes a trapping material with surface characteristics for trapping or adsorbing the sample.

2. The elution apparatus of claim 1, wherein the trapping material is an adhesive material to adhere the sample.

3. The elution apparatus of claim 2, wherein the adhesive material is an adhesive tape.

4. The elution apparatus of claim 1, wherein the sample trap includes a portion of the trapping material to adsorb the sample, and further including a filter that includes the portion of a material to filter the eluate.

5. The elution apparatus of claim 1, wherein the one or more filters include a replaceable filter configured to filter the eluate in the elution apparatus, wherein the degassing system includes the replaceable filter and the replaceable filter is configured to filter and degas the eluate.

6. An elution apparatus of claim 1, including:
    a sample trap configured to trap a sample,
    one or more pumps and/or valves configured to move a liquid eluent and a liquid eluate, wherein the eluate includes an extracted portion of the sample that is extracted by the eluent, the pumps including a positive displacement pump configured to mobilise a first volume of the eluent through and/or over and/or past a swabbed area that includes a portion of the sample trap,
    an electronic controller configured to control the one or more pumps and/or valves to move the eluate,
    one or more filters configured to filter the eluate of large particulates and debris,
    a degassing system configured to degas the eluate, and
    a capillary with a Low-Voltage (LV) end, wherein the one or more pumps and/or valves are configured to move the degassed eluate to the LV end of the capillary for capillary electrophoresis, wherein the degassing system comprises at least one of a hydrophobic membrane and a confined chamber that is pressure controlled so as to remove gas bubbles from the eluate.

7. An elution apparatus including:
a sample trap configured to trap a sample;
one or more pumps and/or valves configured to move a liquid eluent and a liquid eluate, wherein the eluate includes an extracted portion of the sample that is extracted by the eluent, the pumps including a positive displacement pump configured to mobilise a first volume of the eluent through and/or over and/or past a swabbed area that includes a portion of the sample trap;
an electronic controller configured to control the one or more pumps and/or valves to move the eluate;
one or more filters configured to filter the eluate of large particulates and debris;
a degassing system configured to degas the eluate; and
a capillary with a Low-Voltage (LV) end, wherein the one or more pumps and/or valves are configured to move the degassed eluate to the LV end of the capillary for capillary electrophoresis, and
wherein the sample trap has a surface structure configured to absorb the sample.

8. An elution method, the elution method including:
trapping a sample in a sample trap including:
trapping or adsorbing the sample to a trapping material, wherein the sample trap includes the trapping material with surface characteristics that trap or adsorb the sample, or
absorbing the sample to the sample trap, wherein the sample trap has a surface structure that absorbs the sample;
moving a liquid eluent and a liquid eluate, wherein the eluate includes an extracted portion of the sample that is extracted by the eluent,
wherein the elution method includes:
initiating a sample processing method controlled by an electronic controller,
wherein the sample processing method includes:
mobilising, via a positive displacement pump, a first volume of the eluent through and/or over and/or past a swabbed area that includes a portion of the sample trap;
moving the eluate through one or more filters to filter the eluate of large particulates and debris;
moving the eluate through a degassing system to degas the eluate; and
moving the degassed eluate to a Low-Voltage (LV) end of a capillary for capillary electrophoresis.

9. The elution method of claim 8, including:
swabbing with the sample trap to trap the sample in a portion of a material of the sample trap.

10. An elution method including:
trapping a sample in a sample trap, including swabbing with the sample trap to trap the sample in a portion of a material of the sample trap;
moving a liquid eluent and a liquid eluate, wherein the eluate includes an extracted portion of the sample that is extracted by the eluent,
wherein the elution method includes initiating a sample processing method controlled by an electronic controller, the sample processing method includes:
mobilising, via a positive displacement pump, a first volume of the eluent through and/or over and/or past a swabbed area that includes a portion of the sample trap;
moving the eluate through one or more filters to filter the eluate of large particulates and debris;
moving the eluate through a degassing system to degas the eluate; and
moving the degassed eluate to a Low-Voltage (LV) end of a capillary for capillary electrophoresis, and
wherein:
the first volume of the eluent constitutes a first reagent; and
the sample processing method further includes:
forcing the first reagent through or past the portion of the material, including the portion of the sample trap, to form the eluate;
moving the degassed eluate to a ground manifold such that the degassed eluate is positioned at the Low-Voltage (LV) end of the capillary;
injecting the degassed eluate into the capillary;
flushing a ground manifold with electrolyte to position an electrolyte solution at the LV end of the capillary; and/or
energizing a High Voltage (HV) power supply to separate the sample.

11. The elution method of claim 10, including filtering the eluate in an elution apparatus using the portion of the material, and/or wherein filtering the eluate through the one or more filters and degassing the eluate includes a replaceable sample filter filtering and degassing the eluate in one step.

12. A system including:
an elution apparatus including:
a sample trap configured to trap a sample,
one or more pumps and/or valves configured to move a liquid eluent and a liquid eluate, wherein the eluate includes an extracted portion of the sample that is extracted by the eluent, the pumps including a positive displacement pump configured to mobilise a first volume of the eluent through and/or over and/or past a swabbed area that includes a portion of the sample trap,
an electronic controller configured to control the one or more pumps and/or valves to move the eluate,
one or more filters configured to filter the eluate of large particulates and debris,
a degassing system configured to degas the eluate, and
a capillary with a Low-Voltage (LV) end, wherein the one or more pumps and/or valves are configured to move the degassed eluate to the LV end of the capillary for capillary electrophoresis; and
a detection apparatus including a conductivity detector coupled to a high-voltage (HV) end portion of the capillary and configured to generate signals based on conductivity of a monitored portion of the capillary in the HV end portion,
wherein the conductivity detector is electrically isolated from the LV end.

13. The system of claim 12, wherein the conductivity is complex conductivity.

14. The system of claim 12, wherein the detection apparatus includes a wireless electrical connection configured to electrically power the conductivity detector.

15. The system of claim 14, wherein the wireless electrical connection includes a wireless electrical transmitter and a wireless electrical receiver.

16. The system of claim 12, wherein the detection apparatus includes an optical communications link configured to communicate signals from and/or to the conductivity detector.

17. The system of claim 12, wherein the conductivity detector is a capacitive conductivity detector, and/or a contactless conductivity detector, and/or a capacitively coupled contactless conductivity detector (C4D), and/or a contacting conductivity detector having electrodes in contact with a capillary fluid.

18. The system of claim 12, wherein the detection apparatus includes one or more of:
- a phase-sensitive detector configured to determine an in-phase signal component and a quadrature signal component of the conductivity signals from the conductivity detector;
- a signal channel configured to communicate the conductivity signals from the conductivity detector, and a noise channel configured to communicate noise signals in a modulated signal generated for the conductivity detector, wherein the noise channel is separate from the signal channel; and
- a drain conduit configured to carry the monitored portion away from the conductivity detector, or a sponge, wick or drying surface upon which the monitored portion from the capillary is configured to be dried by passing airflow.

19. The system of claim 12, wherein the detection apparatus includes a transmit electrode and a receive electrode.

20. The system of claim 19, wherein the transmit electrode and the receive electrode are Printed Circuit Board (PCB) assemblies.

21. A method including:
- the elution method of claim 8; and
- a detection method including a conductivity detector coupled to a high-voltage (HV) end portion of the capillary, and electrically isolated from the LV end, generating signals based on conductivity of a monitored portion of the capillary in the HV end portion.

22. The elution method of claim 8, wherein the degassing system comprises at least one of a hydrophobic membrane and a confined chamber that is pressure controlled so as to remove gas bubbles from the eluate.

\* \* \* \* \*